US012719705B2

(12) United States Patent
Wright

(10) Patent No.: US 12,719,705 B2
(45) Date of Patent: Aug. 25, 2026

(54) METHODS AND SYSTEMS FOR DISTRIBUTED BLOCKCHAIN FUNCTIONALITIES

(71) Applicant: nChain Licensing AG, Zug (CH)

(72) Inventor: Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 113 days.

(21) Appl. No.: 18/700,533

(22) PCT Filed: Oct. 25, 2022

(86) PCT No.: PCT/EP2022/079837
§ 371 (c)(1),
(2) Date: Apr. 11, 2024

(87) PCT Pub. No.: WO2023/072965
PCT Pub. Date: May 4, 2023

(65) Prior Publication Data

US 2025/0150290 A1 May 8, 2025

(30) Foreign Application Priority Data

Oct. 28, 2021 (GB) .................................... 2115511
Oct. 28, 2021 (GB) .................................... 2115512
(Continued)

(51) Int. Cl.
*H04L 9/00* (2022.01)
*G06F 16/22* (2019.01)
(Continued)

(52) U.S. Cl.
CPC ............ *H04L 9/50* (2022.05); *G06F 16/2246* (2019.01); *G06F 16/27* (2019.01); *G06F 21/64* (2013.01);
(Continued)

(58) Field of Classification Search
CPC ....... H04L 9/50; H04L 9/3236; H04L 9/3239; H04L 9/3247; H04L 63/12;
(Continued)

(56) References Cited

U.S. PATENT DOCUMENTS 11,108,856 B2 * 8/2021 Li ........................ H04L 9/3239
2017/0132621 A1 * 5/2017 Miller .................. H04L 9/0861
(Continued)

OTHER PUBLICATIONS

Anonymous: "Stratum Protocol", Jul. 25, 2021, URL: https://web.archive.org/web/20210725015731/https:/reference.cash/mining/stratum-protocol.

(Continued)

*Primary Examiner* — Blake I Narramore
(74) *Attorney, Agent, or Firm* — Galvani Smith PLLC

(57) ABSTRACT

The present disclosure provides methods and systems for distributed and/or parallel processing of data records, and in particular mining of blockchain transactions in a blockchain block, and further still for generation of a Proof-of-Work (PoW) for a blockchain block. Advantageously, embodiments allow for separation of the PoW calculation from other blockchain mining/validation tasks. Preferably, a PoW requester sends a specialist PoW provider one or more of: i) a Merkle root for a Merkle tree that represents a set of transactions ii) a control transaction ($TX_0$) and iii) a Merkle proof which confirms that $TX_0$ is included in the set of transactions. $TX_0$ may provide or comprise control data that the PoW provider can use to determine whether or not performance of the PoW calculation is to be performed or completed.

15 Claims, 15 Drawing Sheets

(30) Foreign Application Priority Data

| | | |
|---|---|---|
| Oct. 28, 2021 | (GB) | 2115516 |
| Oct. 28, 2021 | (GB) | 2115520 |
| May 6, 2022 | (GB) | 2206634 |
| May 6, 2022 | (GB) | 2206639 |
| Jun. 15, 2022 | (GB) | 2208799 |
| Jun. 29, 2022 | (GB) | 2209533 |

(51) Int. Cl.

| | |
|---|---|
| ***G06F 16/27*** | (2019.01) |
| ***G06F 21/64*** | (2013.01) |
| ***G06Q 20/38*** | (2012.01) |
| ***G06Q 20/40*** | (2012.01) |
| ***H04L 9/32*** | (2006.01) |
| ***H04L 9/40*** | (2022.01) |

(52) U.S. Cl.

CPC ....... *G06Q 20/3827* (2013.01); *G06Q 20/389* (2013.01); *G06Q 20/401* (2013.01); *H04L 9/3236* (2013.01); *H04L 9/3239* (2013.01); *H04L 9/3247* (2013.01); *H04L 63/12* (2013.01); *G06Q 20/3825* (2013.01); *H04L 2209/56* (2013.01)

(58) Field of Classification Search

CPC . H04L 2209/56; G06F 16/2246; G06F 16/27; G06F 21/64; G06Q 20/3827; G06Q 20/389; G06Q 20/401; G06Q 20/3825

See application file for complete search history.

(56) References Cited

U.S. PATENT DOCUMENTS

| | | | | |
|---|---|---|---|---|
| 2017/0132625 | A1* | 5/2017 | Kennedy | G06Q 20/065 |
| 2018/0336552 | A1* | 11/2018 | Bohli | H04L 9/3297 |
| 2019/0114182 | A1* | 4/2019 | Chalakudi | H04L 63/0442 |
| 2020/0356082 | A1* | 11/2020 | Wang | G05B 19/4185 |
| 2020/0403809 | A1* | 12/2020 | Chan | G06F 16/27 |
| 2021/0273807 | A1* | 9/2021 | Wertheim | G06F 9/466 |

OTHER PUBLICATIONS

GB2206634.4 Combined Search and Abbreviated Examination Report dated Oct. 17, 2022, 7 pages.

Guo, Huan et al., “A High Performance IPv Flow Table Lookup Algorithm Based on Hash”; WTMC’16, May 30, 2016, Xi’an China.

PCT/EP2022/079837 International Search Report and Written Opinion dated Feb. 10, 2023, 11 pages.

Ruben Recabarren et al: “Hardening Stratum, the Bitcoin Pool Mining Protocol”, arxiv.org, Cornell University Library, 201 Olin Library Cornell University Ithaca, NY 14853, Mar. 20, 2017.

* cited by examiner 100
150
151n-1
151n
153
152
Block pointer
155
152
154
Gb
Tx
152j
Block Bn-1
Block Bn
Pool
152i
Blockchain
(maintained at each node)
104
101
Validate and propagate Tx
Race to create blocks
104
104
152j
152j
Nodes of P2P network
106
Send Tx to be propagated
Internet
Side channel
105a
102a
107
102b
105b
103a
103b
Alice
(payer)
Bob
(payee)

Figure 10:
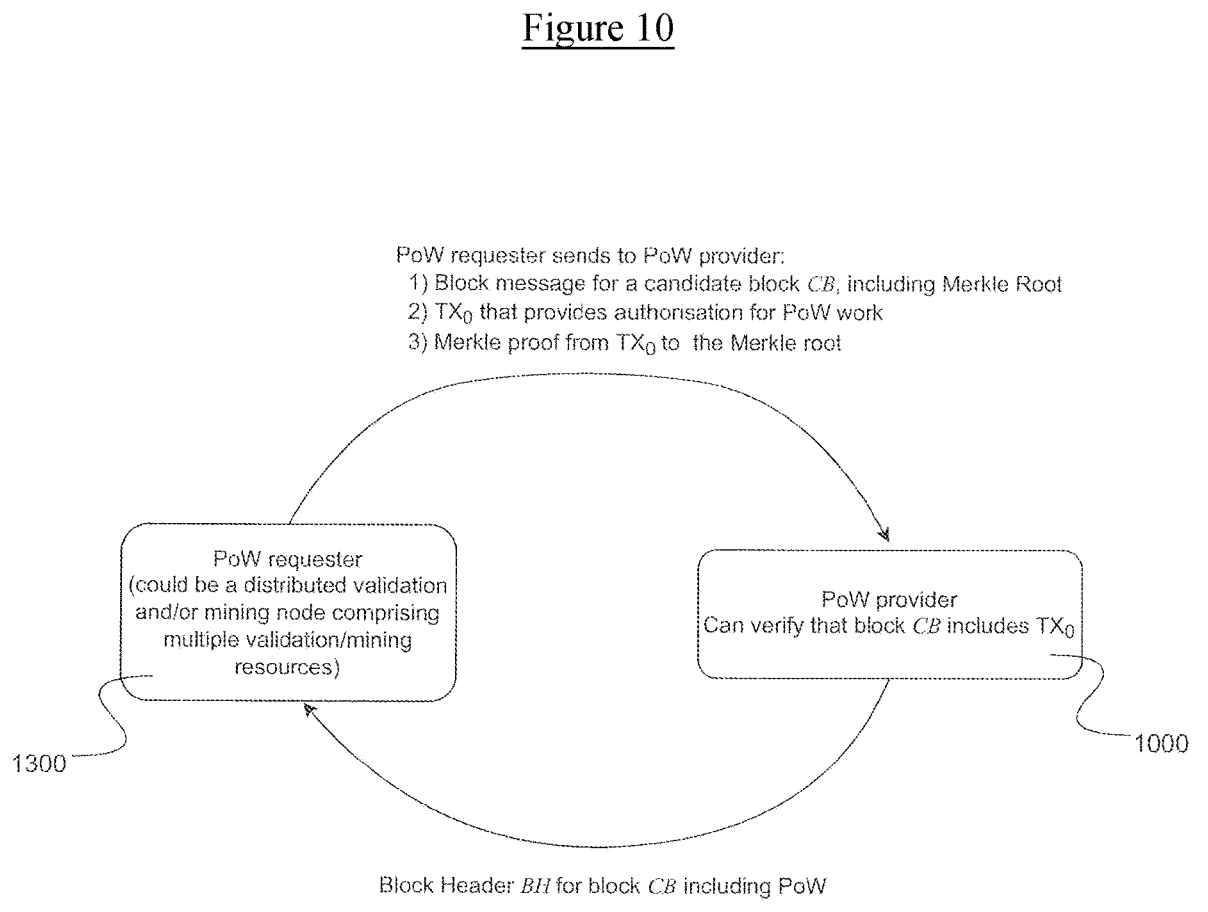

PoW requester sends to PoW provider:
1) Block message for a candidate block *CB*, including Merkle Root
2) $TX_0$ that provides authorisation for PoW work
3) Merkle proof from $TX_0$ to the Merkle root PoW requester
(could be a distributed validation and/or mining node comprising multiple validation/mining resources)

PoW provider
Can verify that block *CB* includes $TX_0$

1300

1000

Block Header *BH* for block *CB* including PoW

Figure 11 (prior art - block mining process)
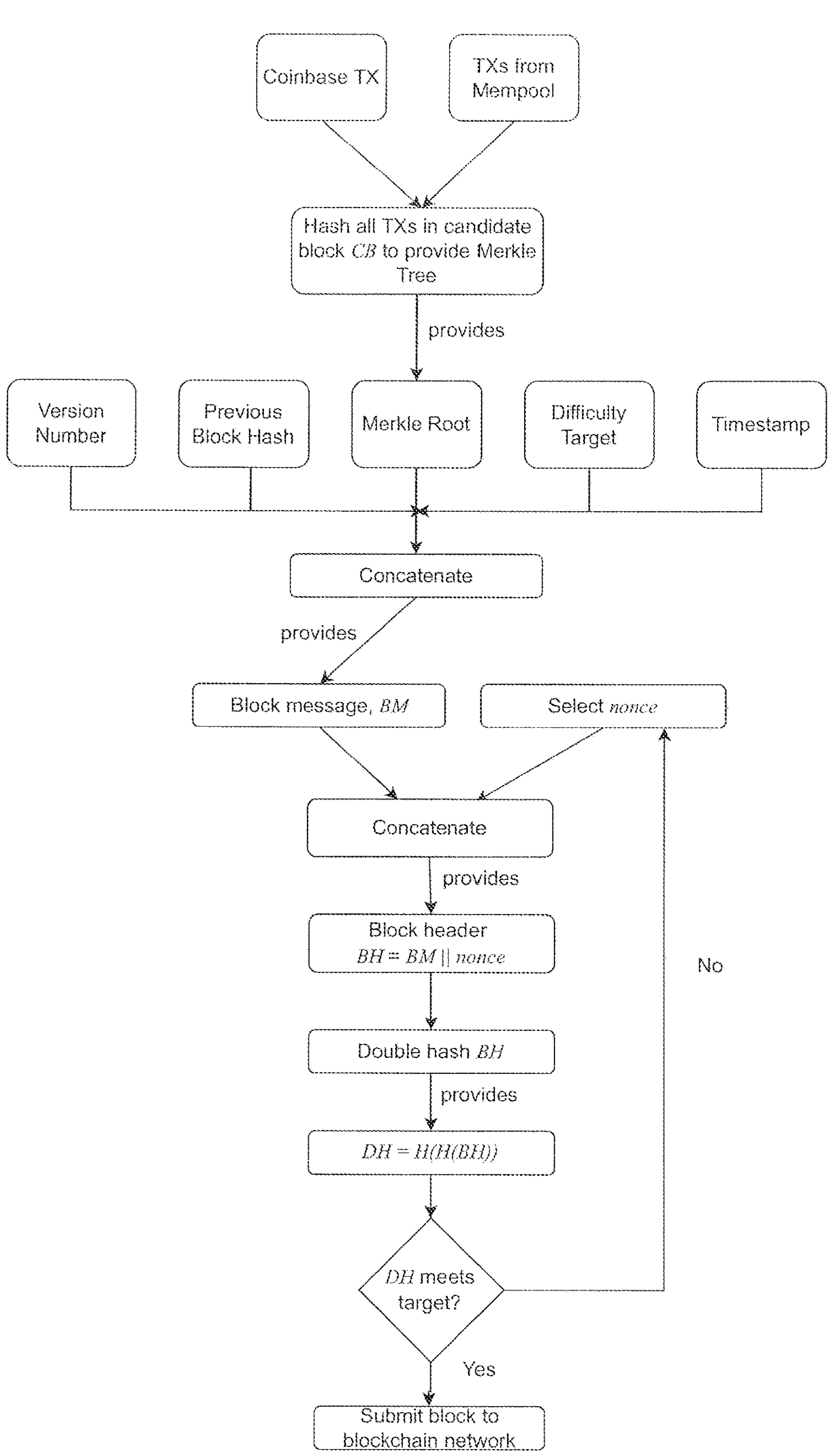

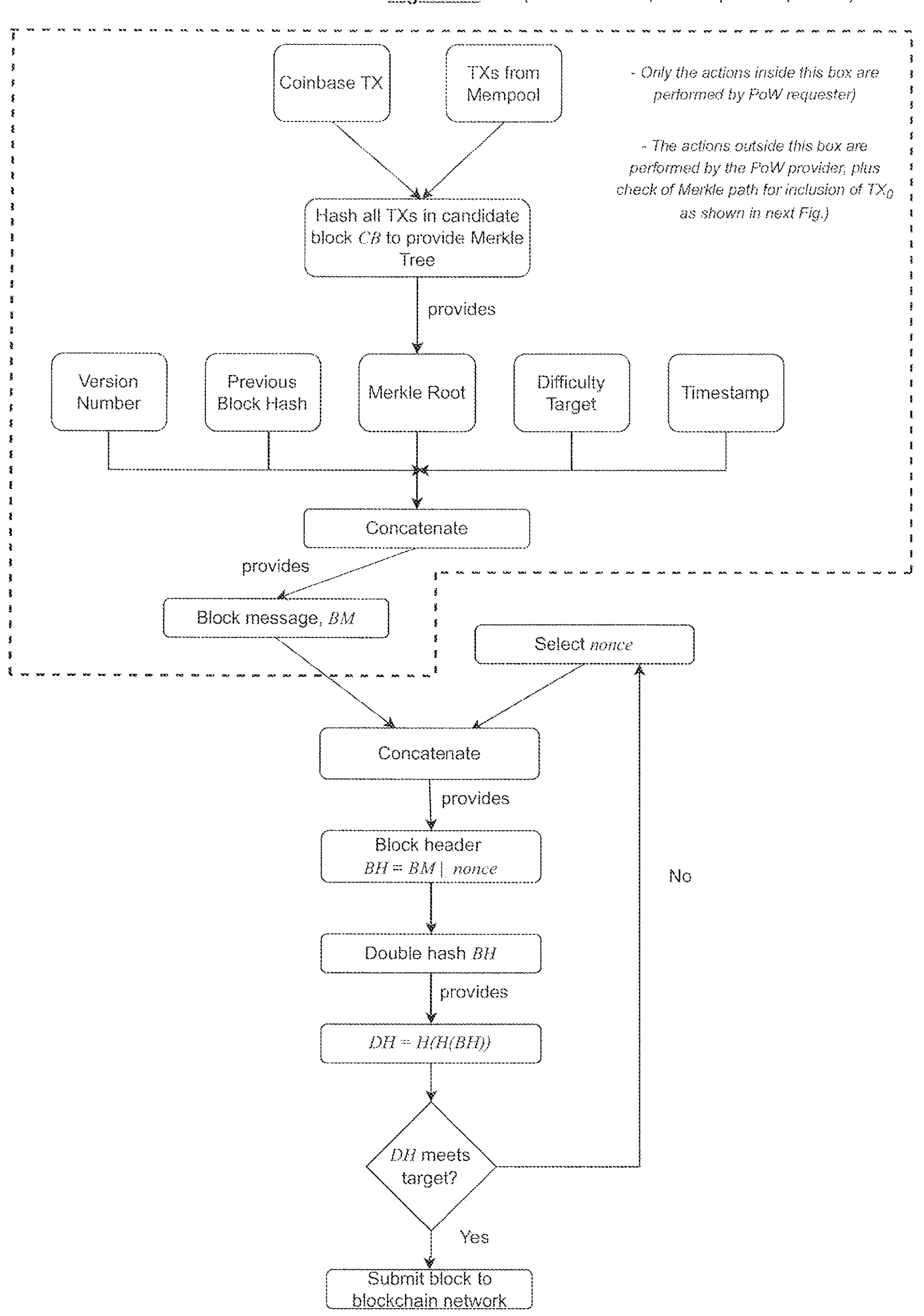
Figure 12 (disclosure compared to prior art process)
- Only the actions inside this box are performed by PoW requester)
- The actions outside this box are performed by the PoW provider, plus check of Merkle path for inclusion of $TX_0$ as shown in next Fig.)
Coinbase TX
TXs from Mempool
Hash all TXs in candidate block $CB$ to provide Merkle Tree
provides
Version Number
Previous Block Hash
Merkle Root
Difficulty Target
Timestamp
Concatenate
provides
Block message, $BM$
Select $nonce$
Concatenate
provides
Block header $BH = BM \| nonce$
Double hash $BH$
provides
$DH = H(H(BH))$
$DH$ meets target?
No
Yes
Submit block to blockchain network

METHODS AND SYSTEMS FOR DISTRIBUTED BLOCKCHAIN FUNCTIONALITIES

CROSS REFERENCE TO RELATED APPLICATIONS

This application is the U.S. National Stage of International Application No. PCT/EP2022/079837 filed on Oct. 25, 2022, which claims the benefit of United Kingdom Patent Application No. 2115511.4 filed on Oct. 28, 2021; United Kingdom Patent Application No. 2115512.2 filed on Oct. 28, 2021; United Kingdom Patent Application No. 2115516.3 filed on Oct. 28, 2021; United Kingdom Patent Application No. 2115520.5 filed on Oct. 28, 2021; United Kingdom Patent Application No. 2206634.4 filed on May 6, 2022; United Kingdom Patent Application No. 2206639.3 filed on May 6, 2022; United Kingdom Patent Application No. 2208799.3 filed on Jun. 15, 2022; and United Kingdom Patent Application No. 2209533.5 filed on Jun. 29, 2022, the contents of which are incorporated herein by reference in their entireties.

FIELD

This disclosure relates generally to improved methods and systems for processing of related or associated data records, and/or implementation of distributed networks. The disclosure is particularly suited, but not limited, to use in respect of transfers effected over or using a blockchain network, such as pre and/or post mining validation of blockchain transactions, SPV checks etc. Advantages include, but are not limited to, improvements in security and resilience, efficiency or reduction of speed and resource requirements, and novel approaches to validation that have not been possible with prior art arrangements, thus leading to blockchain-implemented arrangements that have not been previously possible.

BACKGROUND

While the Bitcoin protocol and network may be referred to herein for the purpose of providing illustrative context for implementation, the disclosure is not limited to use with the Bitcoin blockchain and alternative protocols and implementations (including accounts-based and those comprising Proof-of-Stake consensus) fall within its scope. Hereafter, the term “UTXO” may be used to refer to a transaction output purely for convenience, and should not be construed as meaning that embodiments of the disclosure are limited to use in respect of UTXO-based blockchain models.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception.

In order for a transaction (Tx) to be written to the blockchain, it must be validated. Network nodes (miners) perform work to ensure that each transaction is valid, with invalid transactions rejected from the network. In some protocols, software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network i.e. it is propagated; ii) added to a new block built by a miner; and iii) mined, i.e. added to the public ledger of past transactions. Once the transaction is stored in the blockchain as a UTXO, a user can transfer control of the associated cryptocurrency to another address associated with an input in another transaction that is subsequently written to the blockchain. This is often done using a digital wallet which stores the public and private key pairs associated with the user's cryptocurrency. There are various forms of known cryptocurrency wallet, including the SPV wallet (Simplified Payment Verification). SPV techniques allow users and merchant nodes to perform local verification based on only partial information that is relevant to a particular transfer. SPV is discussed in more detail below.

However, it is known that while validation is essential to ensure security, conformity with the relevant protocol for a given blockchain, and protection against double spends exploits, it is recognised that such validation tasks can require significant resources and time due to the need to download and store blocks, maintain large UTXO pools and perform the necessary processing tasks for verification. Many users are either unable to meet such requirements or would prefer not to, possibly as they do not need to. Thus, there is a need for a faster, more efficient verification model which addresses at least these challenges (and others) without compromising security or requiring adaption of the existing protocol.

Such an improved solution has now been devised.

SUMMARY

Embodiments of the disclosure provide improved blockchain-related methods, devices and systems. In accordance with one form of wording, such embodiments provide solutions for validating or mining blockchain transactions and/or partial or entire blockchain blocks. In accordance with additional or alternative forms of wording, they provide secure solutions for controlling, managing and/or enhancing the efficiency, resource requirements, speed and/or resilience of known approaches to processing of blockchain transactions. Embodiments also enable scalability of blockchain-implemented solutions, providing improved methods and technical architectures for electronic transfer of digital resources. Embodiments may also comprise methods for enabling and/or controlling calculation/generation of a Proof-of-Work for a blockchain block in a distributed and/or parallelised fashion.

Embodiments of the disclosure may be implemented in part or entirety by a variety of apparatus. These may be hardware and/or software-based apparatus, including (but not limited to) one or more virtual machines, servers, GPU-based computing resources, or multiprocessor systems. Additionally, or alternatively, embodiments may comprise one or more digital wallets. Importantly, though, embodiments provide mechanisms for distributed processing of blockchain-related validation tasks. The coordination, management and control of distributed processes is known to be inherently technical in nature because it requires a holistic understanding of the interaction between the hardware and software components involved, and implementations of such distributed solutions extend beyond the technically trivial.

Embodiments may comprise solutions which enable or facilitate the distribution of mining tasks across multiple processing resources.

Embodiments of the disclosure may comprise methods and systems as described, illustrated and claimed herein in respect of the section entitled "Distributed Mining". Such embodiments may comprise techniques for authorising, controlling, establishing authorisation of, or otherwise formulating a request for generation of a Proof-of-Work (PoW) for a blockchain block that comprises a particular plurality (set) of transactions. Preferably, the set includes a transaction which comprises at least one portion of control data that a Proof-of-Work provider can use to determine whether or not the requested PoW effort should be initiated, undertaken and/or fulfilled. This may be called the "control transaction" ($TX_0$). The request may also comprise data that the PoW provider can use to determine that $TX_0$ is included in the plurality of transactions. In a preferred embodiment, this may comprise at least one or more of: a Merkle proof, the control transaction ($TX_0$) and/or the root of the Merkle tree that represents the set of transactions. The PoW provider can process the request to ensure that a) the control transaction is included in the set and/or b) comprises the at least one portion of control data that can be used, in conjunction with at least one pre-specified rule, criteria or requirement, to determine whether or not the requested PoW effort should be initiated, undertaken and/or fulfilled.

In combination, the PoW requester and the PoW provider may provide a distributed blockchain mining node. Embodiments provide the ability to separate, distribute and parallelise the various functions and tasks involved in validating and/or mining blockchain transactions.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 10 provides a high-level overview of a preferred embodiment of the disclosure.

FIG. 11 provides an illustration of the traditional approach to validation and mining activities that are performed by a node on a blockchain network, as known in the art.

FIG. 12 shows an illustration of how the traditional tasks of FIG. 2 can be distributed across different entities in accordance with a preferred embodiment of the disclosure.

DETAILED DESCRIPTION

Figure 1:
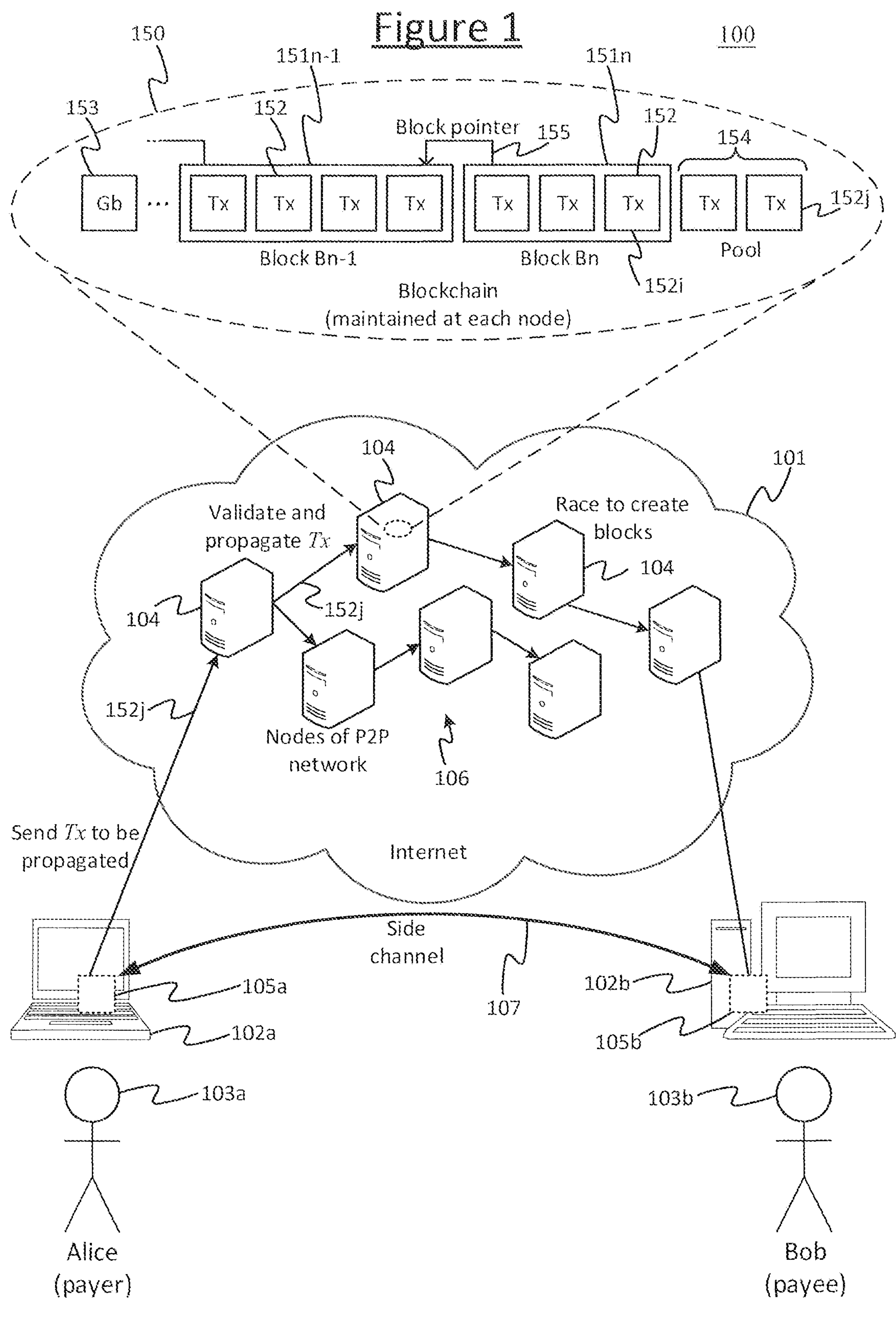
FIG. 1 is a schematic block diagram of a system for implementing a blockchain.

We now describe an example embodiment of the disclosure for the purpose of illustration, without limitation, and with reference to the accompanying Figures.

Traditionally, nodes in a blockchain network maintain a global ledger of all transactions on the blockchain. The global ledger is a distributed ledger and each node may store a complete or partial copy of the global ledger. Transactions by a node affecting the global ledger are verified by other nodes so that the validity and integrity of the global ledger is maintained. The details of implementing and operating a blockchain network, such as one using the Bitcoin protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction may be an address to which control of a value is transferred as a result of the transaction. That value is then associated with that output address as an unspent transaction output (UTXO). A subsequent transaction may then reference that address as an input in order to obtain control or ownership of that value.

As noted above, using the Bitcoin network and protocol as our example, mining nodes compete in a race to create the next block in the blockchain. To assemble a block, a miner will build the block as a set of transactions from the pool of unconfirmed transactions (the "mempool"). It then attempts to complete a proof of work (PoW) puzzle with respect to the block it has assembled. If it manages to complete the PoW prior to receiving notice that any other miner has succeeded in generating its own block and completing its PoW, then the miner propagates its block by sending it to peer nodes on the network. Those nodes validate the block and then send it further on in the network to other nodes. If the miner receives notice that another block has been completed prior to finishing its own PoW, then the miner abandons its efforts and begins trying to build the next block.

Thus, fast propagation of blocks helps to avoid wasted effort (and associated energy) on behalf of miners and validating nodes. By providing a solution which enables faster validation and thus propagation of blocks, the present invention provides an enhanced network performance. It reduces the amount of computing time and effort required, and thus the amount of energy required by the network. It provides a network which is more efficient in terms of resources and time. It provides, ultimately, an improved (blockchain) network.

In current implementations of blockchain, such as the Bitcoin network, each node that receives a block first validates the block before sending it to other nodes. The time taken to validate a block slows propagation of the block through the network. Note that some implementations of blockchain, including evolutions of existing protocols, may provide for block validation by only a subset of nodes rather than each node in the network; however, block validation at most nodes is still likely to be a feature of any blockchain implementation to prevent invalid blocks from propagating through the network.

Validating a block involves confirming that the block meets prescribed criteria set by the applicable blockchain protocol. Example criteria applicable to the Bitcoin protocol may include functions such as CheckBlock and CheckBlockHeader. In addition to confirming that the block itself conforms to prescribed criteria, each transaction within the block may be assessed for compliance with transaction-level criteria. As an example, the transaction-level criteria applied in the Bitcoin protocol may include the functions AcceptToMemoryPool, CheckTransaction and CheckInputs.

Specific examples of block-level criteria, based on the Bitcoin protocol, may include:

The block data structure is syntactically valid.

The block header hash is less than the target difficulty (enforcing the proof of work).

The block timestamp is less than two hours in the future (allowing for time errors).

The block size is within acceptable limits.

The first transaction (and only the first) is a coinbase generation transaction.

All transactions within the block are valid.

Specific examples of transaction-level criteria, based on the Bitcoin protocol, may include:

The transaction's syntax and data structure must be correct.

Neither the list of inputs nor of outputs are empty.

Each output value x, as well as the total of all outputs, must be within the range $0<x<21\cdot10^6$.

None of the inputs have null hash.

nLockTime is less than or equal to INT_MAX.

The transaction size in bytes is greater than or equal to a minimum and less than a maximum.

The number of signature operations is less than the signature operation limit.

The unlocking script scriptSig can only push numbers on the stack, and the locking script scriptPubkey must match isStandard forms.

For each input, if the referenced output exists in any other transaction in the pool, the transaction must be rejected.

For each input, if the referenced output transaction is a coinbase output, it must have at least COINBASE_MATURITY (100) confirmations.

For each input, the referenced output must exist and cannot already be spent.

Using the referenced output transactions to get input values, check that each input value, as well as the sum, are in the allowed range of values x, i.e. $0<x<21\cdot10^6$.

A matching transaction in the pool, or in a block in the main branch, must exist.

The sum of input values must be equal to or more than the sum of output values.

The transaction fee must be sufficient to gain entry to an empty block.

The unlocking scripts for each input must validate against the corresponding output locking scripts.

These example criteria are illustrative and should not be interpreted as sufficient or necessary to all embodiments as the prescribed criteria may differ in different protocols and may change over time for a given protocol if changes are made to the protocol. In general, transaction-level validation criteria are those prescribed characteristics which a transaction must have to be considered valid under the applicable blockchain protocol. Similarly, the block-level validation criteria are those prescribed characteristics which a block must have to be considered valid under the applicable blockchain protocol.

In accordance with the present application methods and devices are described that speed up block validation so as to facilitate faster propagation of blocks in the network.

In one aspect, the present application describes a node structured to validate blocks by performing at least transaction-level validation of individual transactions in parallel and/or in a distributed fashion. However, certain transaction-level criteria may not be evaluated in parallel. For example, the uniqueness of UTXOs may be evaluated on a serial basis. In such cases, the distributed validation node of the present disclosure may be structured or arranged to confirm the uniqueness of the referenced inputs (UTXOs) of the transactions prior to allocating the sets of transactions among a set of two or more parallel processors for validation of the remaining transaction-level criteria.

In particular, embodiments of the present disclosure provide improved verification and security solutions for processing related or associated data records that are stored in a tree structure. The tree can be a binary tree or a mesh structure. As known in the art, tree structures can be decomposed into smaller trees (which may be referred to herein as tree "segments", "subsets" or "portions"), where each segment comprises a subset of the data records in the overall tree and has its own root. Advantageously, embodiments of the disclosure utilise this feature to provide methods and systems for distribution and parallelisation of processing of the related data records across multiple processing resources.

In our example embodiment, the plurality of data records comprises blockchain transactions which are related because they form nodes within a Merkle tree. The Merkle tree has a root which has been, or can be, included in a header of a block of the transactions in accordance with a blockchain protocol, such that the root provides a path that can be followed to every leaf (i.e. transaction ID (TxID)) within the tree. In our example, the blockchain protocol is, or is derived from, the Bitcoin protocol although other protocols fall within the scope of the disclosure.

In our example, processing of the plurality of transactions comprises validating at least a portion of a blockchain block that comprises the plurality of blockchain transactions and the root of the Merkle tree for the block. These examples are non-limiting and techniques disclosed herein may be utilized in respect of non-blockchain related data, and/or in respect of other processes besides validation. For example, embodiments may be used to stored, structure, search and/or maintain any type of data record that can be represented in a Merkle tree. Databases and other known storage resources may be utilized instead of, or as well as, the blockchain ledger.

In another example embodiment, processing of the plurality of transactions comprises downloading at least a portion of a blockchain block that comprises the plurality of blockchain transactions and the root of the Merkle tree for the block.

Figure 3:
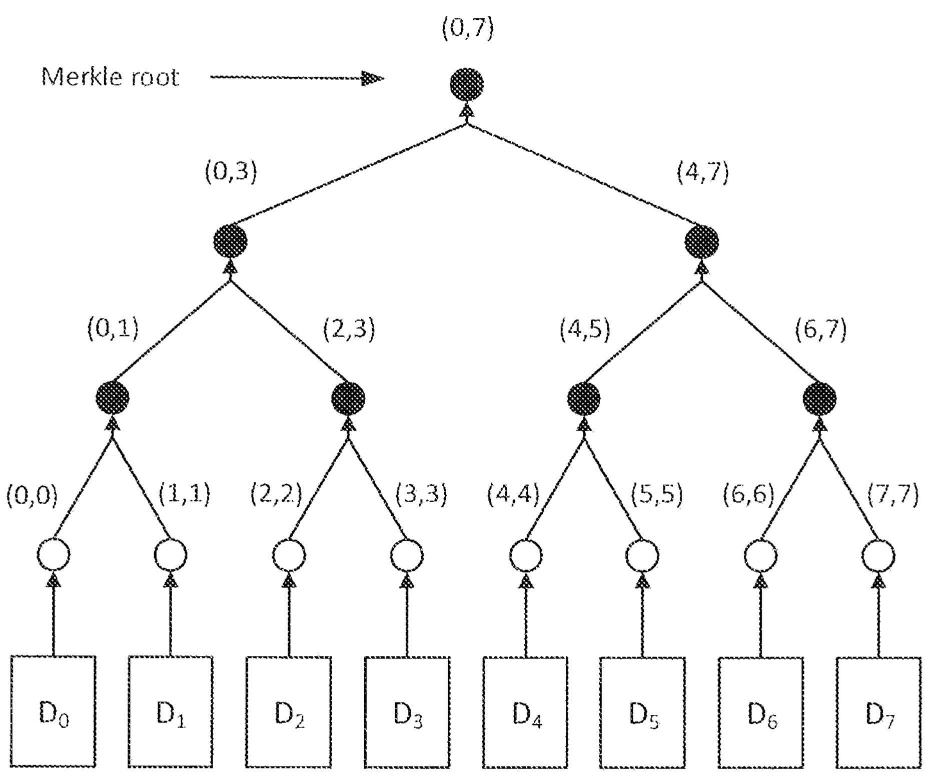
FIG. 3 provides an illustration of a general Merkle tree structure as known in the art.
Figure 4:
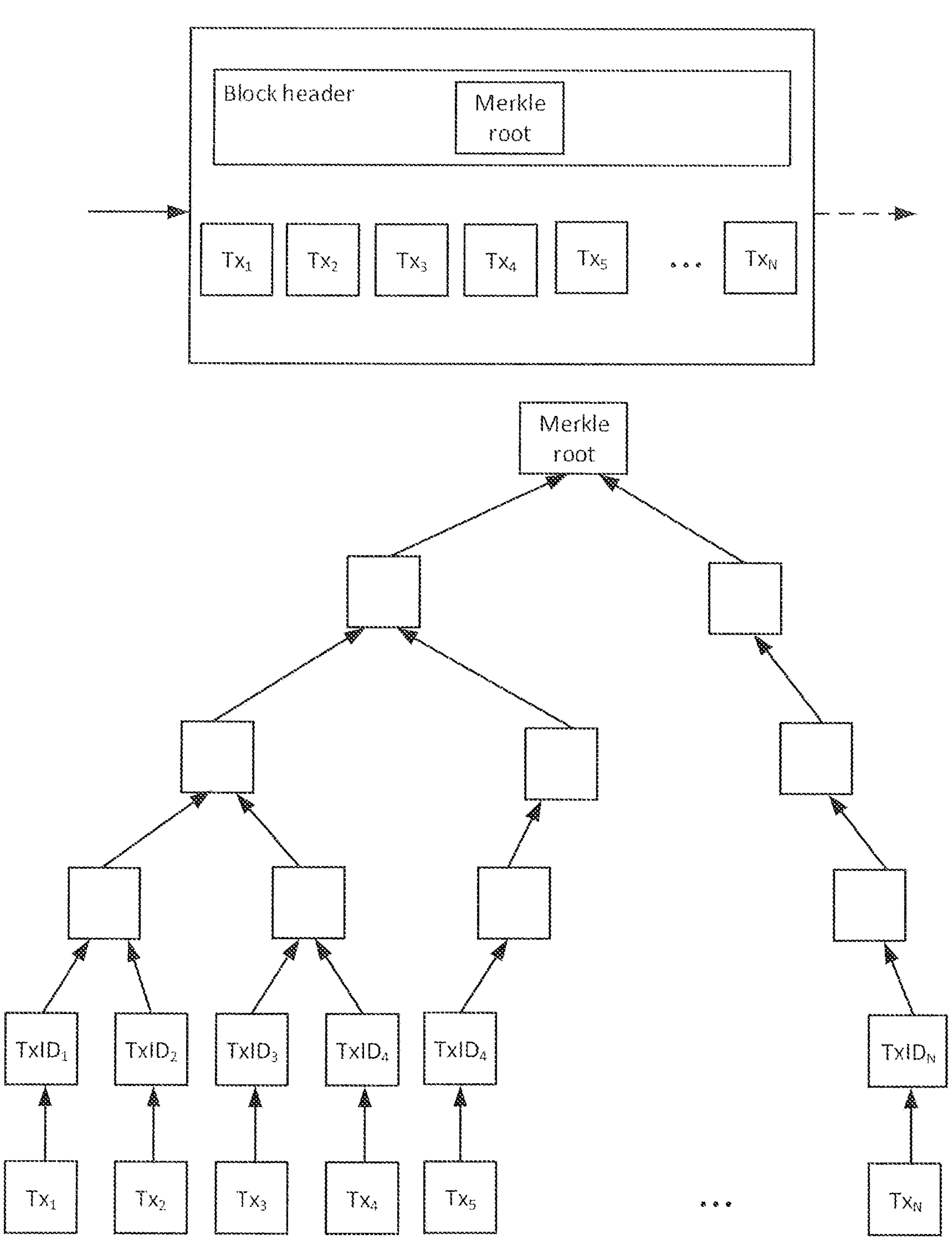
FIG. 4 illustrates how a Merkle root can be derived from a set of blockchain transactions, as known in the art.

For completeness, and with reference to FIGS. 3 and 4, we now provide a discussion of Merkle trees and their use in representing blocks of blockchain transactions.

Merkle Trees

With reference to FIG. 3, Merkle Trees are hierarchical data structures that enable secure verification of collections of data. In a Merkle tree, each node in the tree has been given an index pair (i, j) and is represented as N(i, j). The indices i, j are simply numerical labels that are related to a specific position in the tree.

A feature of the Merkle tree is that the construction of each of its nodes is governed by the following equations $$N(i,j)=\begin{cases} H(D_i) & i=j \\ H(N(i,k)\|N(k+1,j)) & i\neq j \end{cases},$$

where and H is a cryptographic hash function.

An example of a binary Merkle tree constructed according to these equations is shown in FIG. 3. As shown, we can see that the i=j case corresponds to a leaf node, which is simply the hash of the corresponding $i^{th}$ packet of data $D_i$. The i≠j case corresponds to an internal or parent node, which is generated by recursively hashing and concatenating child nodes until one parent (the Merkle root) is found.

For example, the node N(0,3) is constructed from the four data packets $D_0, \ldots, D_3$ as $$\begin{aligned} N(0,3) &= H(N(0,1)\|N(2,3)) \\ &= [H(N(0,0)\|N(1,1))\|H(N(2,2)\|N(3,3))] \\ &= [H(H(D_0)\|H(D_1))\|H(H(D_2)\|H(D_3))]. \end{aligned}$$

The tree depth M is defined as the lowest level of nodes in the tree, and the depth m of a node is the level at which the node exists. For example, $m_{root}=0$ and $m_{leaf}=M$, where M=3 in FIG. 3.

For Merkle trees in Bitcoin and some other blockchains, the hash function is double SHA256, which is to apply the standard hash function SHA-256 twice: H(x)=SHA256 (SHA256(x)).

The primary function of a Merkle tree is to verify that some data packet $D_1$ is a member of a list or set of N data packets $\mathcal{D}\in\{D_0, \ldots, D_{N-1}\}$. The mechanism for verification is known as a Merkle proof and involves obtaining a set of hashes known as the Merkle path for a given data packet $D_i$ and Merkle root R. The Merkle proof for a data packet is simply the minimum list of hashes required to reconstruct the root R by way of repeated hashing and concatenation, often referred to as the 'authentication proof'.

A proof of existence could be performed trivially if all packets $D_0, \ldots, D_{N-1}$ and their order are known to the prover. This does however require a much larger storage overhead than the Merkle proof, as well as requiring that the entire data set is available to the prover. The comparison between using a Merkle proof and using the entire list is shown in the table below, where we have used a binary Merkle tree and assumed that the number of data blocks N is exactly equal to an integer power 2.

The following table shows the relationship between the number of leaf nodes in a Merkle tree and the number of hashes required for a Merkle proof (or Merkle proof).

| | | | | | Merkle tree |
|---|---|---|---|---|---|
| No. data packets | 32 | 256 | 1024 | 1048576 | $N = 2^M$ |
| No. hashes required for proof of existence | 5 | 8 | 10 | 20 | $M = \log_2 N$ |

In this simplified scenario—where the number of data packets is equal to the number of leaf nodes—we find that the number of hash values required to compute a Merkle proof scales logarithmically. It is clearly far more efficient and practical to compute a Merkle proof involving $\log_2 N$ hashes than to store N data hashes and compute the explicit proof.

If, given a Merkle root R, we wish to prove that the data block $D_0$ belongs to the ordered list $\mathcal{D}\in\{D_0, \ldots, D_{N-1}\}$represented by R we can perform a Merkle proof as follows i. Obtain the Merkle root R from a trusted source.

ii. Obtain the Merkle proof F from a source. In this case, Γ is the set of hashes:

$$\Gamma=\{N(1,1),N(2,3),N(4,7)\}.$$

iii. Compute a Merkle proof using $D_1$ and F as follows:

a. Hash the data block to obtain:

$$N(0,0)=H(D_0).$$

b. Concatenate with N(1,1) and hash to obtain:

$$N(0,1)=H(N(0,0)\|N(1,1)).$$

c. Concatenate with N(2,3) and hash to obtain:

$$N(0,3)=H(N(0,1)\|N(2,3)).$$

d. Concatenate with N(4,7) and hash to obtain the root:

$$N(0,7)=H(N(0,3)\|N(4,7)),$$

$$R'=N(0,7).$$

e. Compare the calculated root R' with the root R obtained in (i):

1. If R'=R, the existence of $D_0$ in the tree and therefore the data set $\mathcal{D}$ is confirmed.

2. If R'≠R, the proof has failed and $D_0$ is not confirmed to be a member of $\mathcal{D}$.

This is an efficient mechanism for providing a proof of existence for some data as part of the data set represented by a Merkle tree and its root. For example, if the data $D_0$ corresponded to a blockchain transaction and the root R is publicly available as part of a block header then we can quickly prove that the transaction was included in that block.

SPV

Simplified Payment Verification (SPV) takes advantage of these features of the Merkle tree, as first set out in section 8 of Satoshi Nakamoto's 2008 whitepaper "*Bitcoin: A Peer-to-Peer Electronic Cash System*". In a SPV-based exchange of cryptocurrency between Alice and Bob, both parties use the same type of SPV wallet. The SPV wallet stores the user's private and public keys, unspent transactions and block headers which uniquely identify the blocks so they can be located on the blockchain. As explained, a block header comprises fields of data which provide a unique summary or fingerprint of the entire block's contents as well as a field that provides the Merkle root for that block. The Merkle root is generated by repeatedly hashing together pairs of transaction IDs (TxIDs) from the block until a single hash is finally arrived at. The Merkle root provides an efficient and secure mechanism for verifying that a transaction is part of a block because it allows users such as wallets and merchant nodes to locally verify a particular transaction without downloading the whole blockchain. This is advantageous for users who do not need or wish to run a full node but simply need to perform a localised check that a certain transaction is in a particular block e.g. parties such as merchants and customers who wish to perform a transfer between them. In summary, SPV enables such a user to search a Merkle tree having a given root to check (i.e. verify) whether a particular transaction is included in a particular blockchain block without them having to download and store the entire blockchain.

Therefore, SPV wallets provide at least the advantage that power and storage constrained devices such as phones and laptops are able to operate within the Bitcoin ecosystem because it only needs to confirm that a transaction has been verified (hence the name "simplified payment verification") rather than performing a full check of the blockchain as per other forms of wallet. Since an SPV wallet only downloads block headers without including any of the transactions, this significantly reduces the storage space, energy and processing resources required for verification. SPV wallets are particularly suited for use with embodiments of the disclosure for reasons explained below, and we use the term "verification" herein to include SPV checks.

Blocks of Transactions

FIG. 4 schematically illustrates an example of a blockchain block. Each block contains a block header and a set of transactions. The block header includes, amongst other things, a hash of the previous block header, i.e. a hash of the block header of the block upon which the current block is built. The block header also includes a Merkle root of a Merkle tree built using the set of transactions. Each transaction is first hashed (e.g. double-hashed) to generate a transaction identifier (TxID) of that transaction. The transaction identifiers are then used as the leaf nodes of the Merkle tree. Pairs of transaction identifiers are then concatenated and hashed to form a respective inner node of a first inner level of the Merkle tree. Pairs of inner nodes of the first inner level are then concatenated and hashed to form a respective inner node of a second inner level of the Merkle tree. The process of concatenating and hashing pairs of inner nodes is repeated until only a single hash remains: the Merkle root. This Merkle root is sometimes referred to as the block Merkle root.

Figure 5:
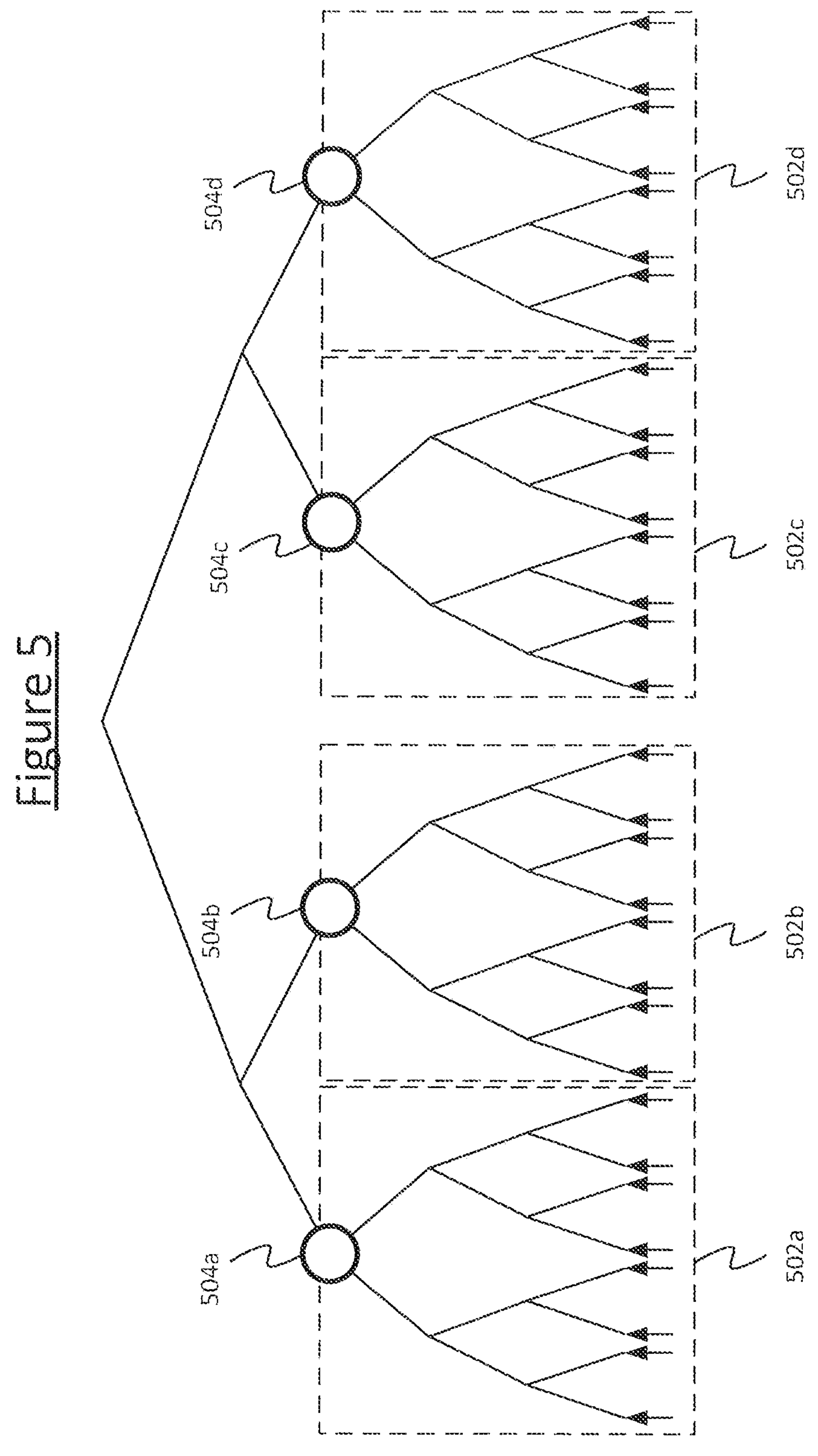
FIG. 5 provides an example of how a Merkle tree can be divided into subsets (or "segments") which may then be allocated to respective validation resources in accordance with an embodiment of the disclosure.
Figure 6:
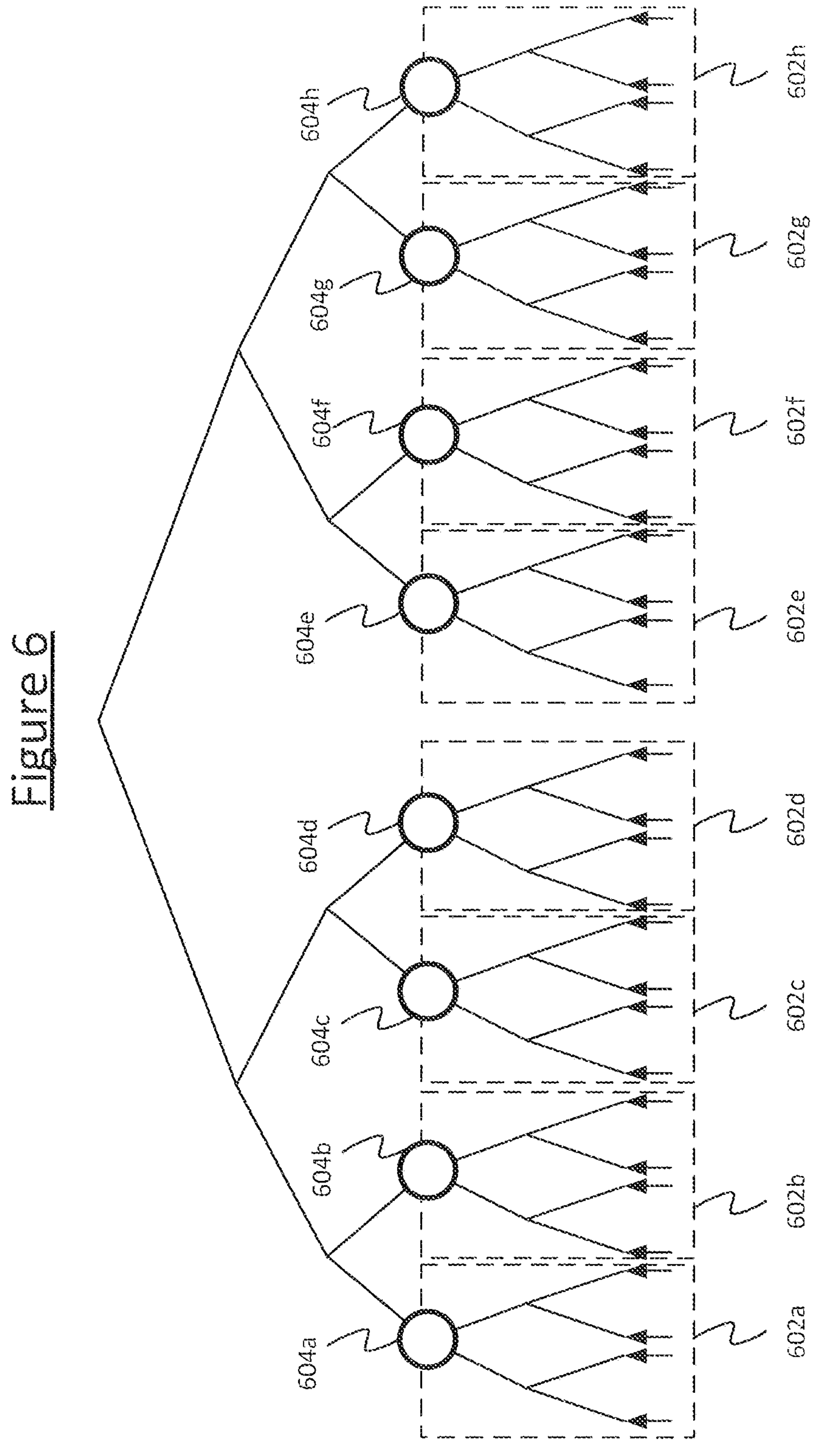
FIG. 6 illustrates an alternative example to FIG. 5 of how a Merkle tree may be divided into logical segments.
Figure 7:
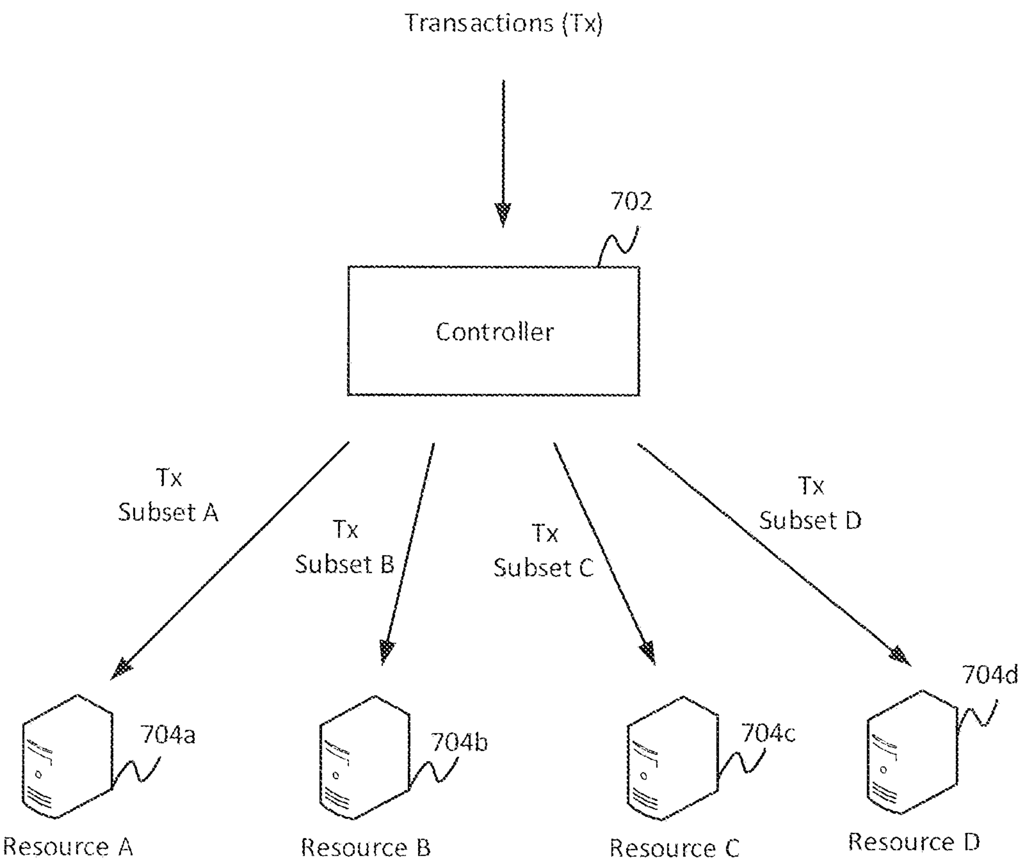
FIG. 7 illustrates, at system level, a distributed validation node in accordance with an illustrative embodiment of the disclosure.

We now turn to embodiments of the disclosure, with reference in particular to FIGS. 5, 6 and 7.

Identifying Segments of a Block's Merkle Tree

Suppose that a particular party e.g. Alice wishes to validate some transactions. In accordance with an embodiment of the disclosure, at least one subset of transactions is identified wherein the subset forms and/or is represented by a segment of the overall Merkle tree for the block. Thus, the block of transactions can be logically segmented into a plurality of segments based on the block's Merkle tree, each segment comprising a subset of the block's transactions and each segment having its own root node (or "root hash"). This common root hash is sometimes referred to below as a "segment hash" to distinguish it from the root hash of the entire block. Transactions on the same level (i.e. the lowest level, sometimes referred to as the "leaf level" or "leaf layer") within a tree segment are siblings. All transactions in a given segment share a common root node for that segment. The common root node may belong to the adjacent level of the Merkle tree, i.e. the level immediately above the lowest level. Alternatively, the common root node may belong to a higher level. In general, the common root node may belong to any level of the Merkle tree between the lowest level and the Merkle root.

Breaking the block down into smaller parts based on its Merkle tree provides significant technical advantages, including the ability to quickly and efficiently allocate transactions across multiple validators. For example, as the bitcoin protocol uses binary trees it is possible to implement binary allocations across multiple machines. By using a small binary marker as an indexing system for the segments, each segment's position in the overall Merkle tree can be calculated quickly, enabling the segments to be put back together after validation has been completed, reconstructing the complete Merkle tree for the block. This binary indexing approach is discussed in more detail below.

Various techniques can be used for identification of the segments, but in accordance with one approach the number of segments may be determined by the number of available validators in the system. For example, in a system having four validators, the Merkle tree may be split into four segments; if there are eight validators, the Merkle tree may be dissected into eight segments and so forth. Identification of the segments for a given Merkle tree can be performed or influenced by a controlling entity, illustrated by controller 702 of FIG. 7.

The points explained above are further illustrated with reference to FIGS. 5 and 6, in which FIG. 5 illustrates an example of how a Merkle tree may be divided into separate portions 502 to be allocated to validators. In the example of FIG. 5, each arrow represents a respective transaction that is hashed to form a respective transaction identifier, which is used at a respective leaf node of the Merkle tree. The top of the Merkle tree is the block Merkle root. In this example, the block of transactions represented by the Merkle tree contains 32 transactions. However, it will be appreciated that this is merely an illustrative example and in general the Merkle tree may contain any number of transactions, depending on the number of transactions in the block. As shown, the Merkle tree is divided into four portions 502*a-d*, indicated by the dashed line boxes. Each portion 502 is linked by a respective common inner node (inner hash) 504 of the Merkle tree, which is indicated by the solid line circles. Each portion 502 represents eight transactions. In this example, the common inner nodes 504 belong to the fourth level of the Merkle tree. According to the embodiments described herein, each respective portion 502 (or rather the transactions that form and/or represent a portion) is allocated to a respective validator for processing, e.g. for validating of the transactions that belong to the respective portion 502.

FIG. 6 illustrates another example of how a Merkle tree may be divided into portions 602. The Merkle tree in FIG. 6 is the same as that of FIG. 5. Now, in this example, the Merkle tree is divided into eight portions 602*a-h*, with each portion 602 representing four transactions. In this example, the common inner nodes 604 belong to the third level of the Merkle tree. The Merkle tree of FIGS. 5 and 6 could instead be divided into more (e.g. sixteen) or less (e.g. two) portions 502, 602. In general, a Merkle tree formed from a set of transactions of a block may be divided into any number of portions 502, 602, where each portion includes a minimum of two transactions.

Allocation of Segments to Respective Validation Resources

Figure 9:
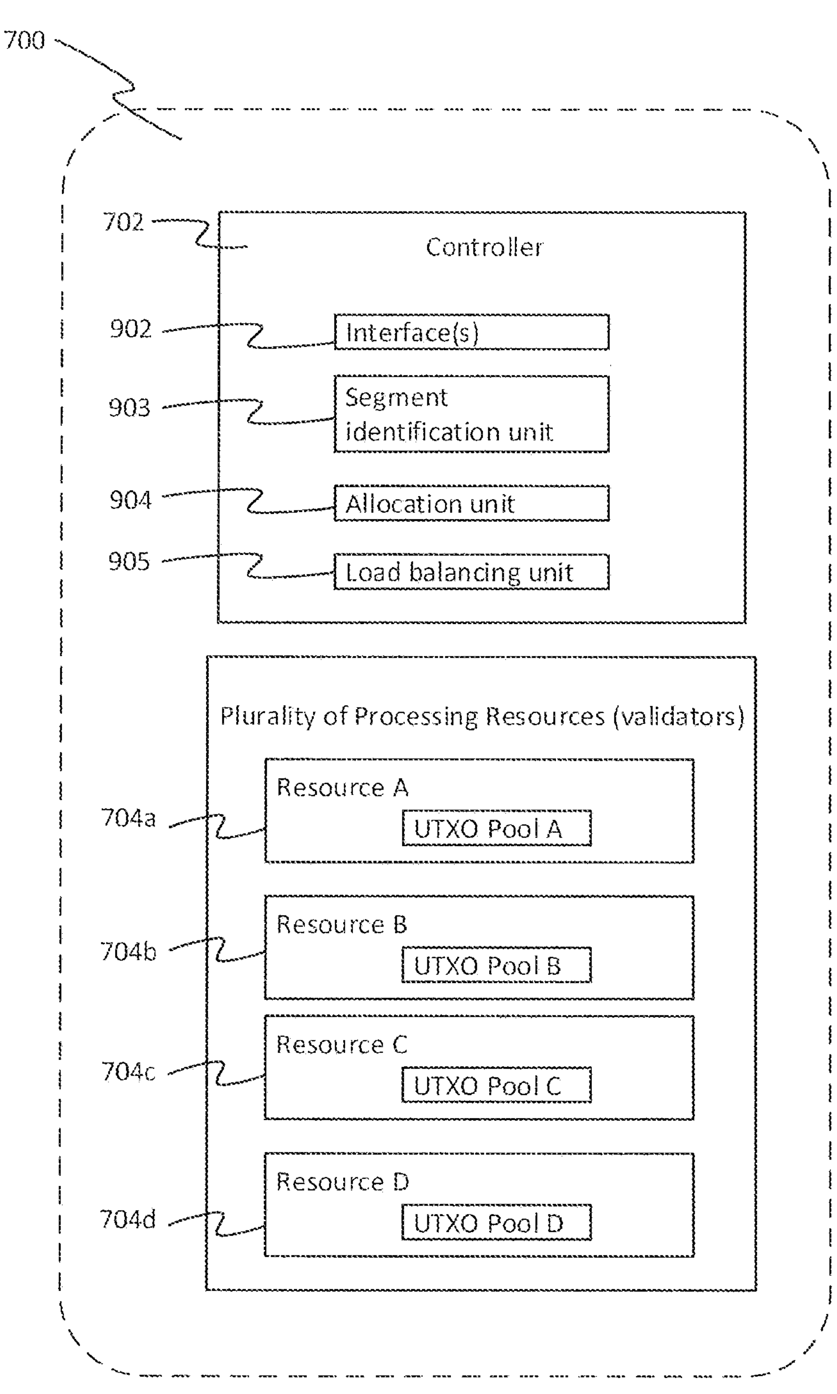
FIG. 9 is a diagram showing the example system of FIG. 7 in more detail.

Following their identification, the subsets of transactions are distributed across a plurality of validation resources, which may also be referred to as "validators" for ease of reference. A plurality of validators is shown as resources A to D (704*a* to 704*d*) in FIGS. 7 and 9. The allocation process may be directed or influenced by a dedicated unit such as component 904 as shown in FIG. 9, without limitation.

Each validator (704*a* to 704*d*) can comprise one or more processing resources. Therefore, at least one of the validators in a plurality of validators (704*a* to 704*d*) may be or comprise at least one of the following: one or more virtual machines, one or more servers, one or more GPU-based computing resources, one or more threads and/or one or more multiprocessor systems etc. Essentially, any of the plurality of validators can be made up of any type(s) or combinations of processing resource, each capable of validating one or more transactions which are associated with each other by a segment of the block's Merkle tree. The plurality of validators (704*a* to 704*d*) and other system components form a collective resource or entity 700, which we will refer to as a "(distributed) validation node".

Preferably, distribution comprises allocating each of the segments to a respective validator within the plurality of validators. The validators may be arranged, at least, to:

operate on the one or more transactions which make up the segment(s) that have been allocated to them validate one or more transactions to verify that they conform to the blockchain protocol, and/or validate that they can be identified in an existing repository such as the blockchain ledger or a database of known, registered or spent transactions.

The validators' activities, and allocation of the subsets to the different validators, may be directed by a controller. FIG. 7 shows controller 702 allocating subsets of transactions A to D for respective tree segments to validators 704*a* to 704*d* respectively. The system-level controller 702 coordinates the activities of systems or devices 704*a* to 704*d* within the distributed validation node, and may control or influence tasks such as identification of tree segments with the block's Merkle tree, allocation of the identified segments to respective validators, reordering of validated tree segments into a complete Merkle tree for the block, and/or ordering transactions within the reconstructed block.

One or more of the validators may comprise at least one coordinating entity arranged to act as a controller at the validator level. Thus, any or all of validators 704*a* to 704*d* may comprise at least one controller component of its own. This lower-level controller may influence or direct operations such as the allocation of tasks or subtasks to one or more processing resources within the validator, reconstruction of the Merkle tree for a given segment, or interaction with other system components e.g. other validators or higher level controllers, UTXO pools, wallets etc. In turn, the processing resources themselves may be further decomposed into smaller systems, one or more of which may comprise a controller and one or more processing resources of its own. In this way, the system may comprise a hierarchical architecture in which segment validation is performed by validating entities comprising one or more processing resources for performing the validation tasks and one or more controllers for coordination of the processors' activities and the execution of inter-component communications.

In embodiments where a validator comprises multiple processing resources, the validator may split its allocated segment into smaller segments. The validator's controller can then distribute the sub-segments across the processors under its control. In this way, the validation process can be implemented in a hierarchical and distributed manner.

This hierarchical decomposition can also be extended to the transaction level so that the validation may be further decomposed into sub-processes or tasks per transaction rather than at the tree segment level. In this approach, the validation of individual transaction(s) is broken down into sub-tasks that are distributed across different machines, or different threads running on the same or different machines. These processes can be queued such that as a thread becomes available, another transaction or task is allocated to it.

Thus, the disclosure enables many transactions to be processed simultaneously, with the only limit being the amount of hardware available to form the distributed validation node rather than the amount of available processing speed being the bottleneck, as per traditional techniques. This enables blockchain processing systems to scale horizontally without the need to alter the underlying protocol of the blockchain network.

Therefore, the disclosure represents a significant deviation from the traditional approach to validation which is described in more detail ion the section below entitled "Example technical environment for implementation of an illustrative embodiment of the disclosure", and with reference to FIGS. 1 and 2. As explained, the traditional approach involves one block being validated as an entire entity, and the traditional view of a validation node (see FIG. 1, 104) being a single computing unit. By contrast, embodiments of the disclosure break the Merkle tree into multiple segments which are given to different validators (704*a* to 704*d* in FIGS. 7 and 9), each of the segments and validators being capable of being further broken down to enhance the degree of distribution involved.

Further still, by breaking each block down into segments based on its Merkle tree, embodiments of the disclosure enable validators to access, download and process small portions of the block rather than the whole block. Recall that the transactions in each segment hash up (in pairs) to a single root value. This means that the segment can be validated using only the necessary, relevant transactions rather than the entire block being downloaded, stored and processed in entirety. As protocols such as Bitcoin SV allow for scaling of block size and inclusion of larger blocks in the ledger, the traditional model of downloading a whole block becomes a bottleneck. Embodiments of the disclosure overcome this challenge to blockchain scalability by enabling individual validators to receive and process only the (smaller) parts that are relevant to them. This results in faster overall validation times, an improved blockchain network and improved applications which run on the blockchain.

Further still, embodiments support and facilitate the use of SPV processes and resources, because such SPV involves local validation of only parts of the Merkle tree that are of interest to a given party. The tree-pruning nature of SPV technologies are, therefore, ideally suited for use in combination with embodiments of the present disclosure. In an SPV context, validators may be provided with only the portions of the block data that they need i.e. block header or segment root node and relevant transactions.

When each validator has performed its check and confirmed the validity of the segment that it has processed, it can be guaranteed that the block is valid due to the hashing mechanism that is used to generate the tree.

Load Balancing Across the Plurality of Validators

Load balancing techniques and systems are known in the art, arranged with the aim of evenly distributing tasks across multiple resources so as to enhance efficiency. The aim is to minimize the risk of some processing resources lying idle while others become overloaded and thus risk degradation of performance or even failure. Therefore, load balancing becomes important in ensuring the resilience of the overall system as well as its performance and efficiency. Embodiments of the disclosure may utilize any known load balancing technique such as, for example, static or dynamic load balancing. Additionally, or alternatively, the load balancing approach disclosed herein may be used to advantage.

As mentioned above, embodiments of the disclosure can use an indexing system in the allocation of block segments to respective validators. Preferably, this is a binary indexing system. In this preferred system, each validator is designated a binary label or identifier. Suppose that each identifier is 4 digits long, with the first validator being identified as 0000, the next validator being identified as 0001, the next as validator 0010 and so on. Clearly, a 4 digit identifier allows for 256 validator IDs, with the last validator being identified as 1111 (i.e. validator number 255 in decimal).

When a tree segment needs to be assigned to a validator, the first 4 digits of its double hash (i.e. the segment hash of the tree segment) can be used to determine which validator will process that segment. Recall that a Merkle root is generated by hashing together pairs of transaction IDs (TxIDs) from a block to generate respective inner nodes (or inner hashes) of the Merkle tree, and then repeatedly hashing adjacent inner hashes until a single hash is finally arrived at. This double-hashed Merkle root provides an efficient, quick and secure verification mechanism. It also provides the advantage, in the present context, that the double hash generates a random binary number. Each inner hash, including each segment hash, is itself a double hash. Thus, we can take the first x number of leading digits of the segment hash as the allocation index. A hash with four leading zeroes will result in the tree segment being allocated to the validator with ID 0000, and hash with leading digits 0001 will result in allocation to validator with ID 0001 and so on. The random generation of the double hashes ensures a random distribution of tree segments to validators.

Although double-hashing is typically used when generating a Merkle tree, it is not essential in all examples and instead only single-hashing may be used. In fact, any number of hash operations will result in a random binary number. The load balancing tasks may be performed by a dedicated system component, shown as 905 in FIG. 9, or may be provided elsewhere within the system 700, or in association and communication with the system 700.

Distributed Downloading of Blocks

According to some embodiments, the allocation of segments of the block Merkle tree to different validators may be used to provide a faster and more efficient process for downloading part or all of a block of transactions.

Each validator is allocated a segment of the Merkle tree, e.g. based on the allocation index described above. Any given validator then operates to download the set of transactions that form the allocated tree segment. This may involve downloading the set of transactions form the blockchain itself (e.g. from a blockchain node) or form a different resource or entity, such as a third party service provider. The set of transactions may be downloaded to internal memory of the validator, or to a shared storage location, such as a shared drive in the cloud.

The distributed node may require the full block, i.e., the entire set of transactions that form the block. In that case, each validator that is assigned a tree segment downloads the subset of transactions that form the segment. In other scenarios, the distributed node may only require certain parts of the block. In that case, only some of the validators may need to download their respective subsets of transactions in order to obtain the desired transactions.

Downloading a block (or part a block) in this fashion results in a faster overall download, as each validator only to process a subset of transactions of the entire set of transactions that form the block. This contrasts with conventional block downloading whereby a given entity (e.g., a full node) would have to download the entire block, e.g., by downloading each transaction in order as it appears in the block. Now, the block is downloaded in parallel by multiple validators. A block may contain tens of thousands of transactions, if not several orders of magnitude more. A single entity downloading this number of transactions would consume significant resources and take a considerable amount of time. The computational burden is now distributed amongst the validators such that each individual validator consumes a fraction of the processing resources. Similarly, the overall time to download the block is reduced.

As discussed, each validator may download a subset of transactions. The subsets may then be combined so as to reconstruct the block in a single storage location. (By "single storage location" we mean either a storage resource which is a self-contained entity or a plurality of associated storage resources which form a collective entity). To do so, the individual validators may transmit their respective subsets to a central controller of the distributed node which is configured to arrange the transactions in the correct order. The segment hash (i.e., the hash that links the tree segment) may be utilized for this purpose. For instance, a mapping may be maintained of the segment hash to its position in the Merkle tree, e.g., from left to right as the segment hash appears in the Merkle tree. The subsets of transaction may then be placed in order (e.g., from first to last as) based on the corresponding segment hash.

In some embodiments, the individual validators (or the distributed node as a whole) may confirm that the correct transactions have been downloaded (or that the transactions have been downloaded correctly) by reconstructing the Merkle tree. After downloading a subset of transactions, a validator may generate a candidate segment hash based on those transactions. The candidate segment hash is constructed by hashing pairs of TxIDs to generate respective inner hashes, and repeatedly hashing pairs of inner hashes until a candidate segment hash is produced. The level of the Merkle tree that the candidate segment hash belongs to will depend on the number of tree segments that the Merkle tree is divided into. The validator may verify that the candidate segment hash is a hash of the Merkle tree. If the hashes do not match, then an error has occurred during download. In some examples, each validator may generate the candidate segment hash and send it to a controller to perform the verification. As another example, a candidate block Merkle root may be generated based on the entire set of downloaded transactions. Again, the candidate Merkle root should match the actual block Merkle root (i.e. the Merkle root stored in the block) if the block has been correctly downloaded.

In some cases, the validators may validate the downloaded transactions using the techniques described above. That is, each validator is allocated a tree segment, downloads the corresponding subset of transactions, and validates those transactions. In other cases, the validators may not necessarily validate the transactions and may simply download the transactions for later use, e.g., for sending to a third party.

Distributed UTXO Pools

Preferably, each validator 704 that forms part of the distributed validation node has its own repository (pool) for generating, storing and/or maintaining unspent transaction outputs (UTXOS). This functions as a UTXO pool that provides a record of unconsumed i.e. unspent outputs associated with blockchain transactions. Each validator's UTXO pool is, therefore, based on and constructed from the transactions that are allocated to it by the controller in respect of Merkle tree segments. In one embodiment, this may be a (graph) database comprising data relating to the unspent UTXOs of transactions that have been assigned to a given validator for processing. A record in the database is created for each UTXO that the validator becomes aware of as new Merkle tree segments are allocated to it. From the perspective of the distributed validation node, therefore, the UTXO pool is not one single pool but is made up of a plurality of different UTXO pools, each provided at or on different validators and comprising different sets of UTXOs. The UTXO pool for the node is, therefore, distributed in both in terms of the data and also the resources which store and/or process it.

This is a significant divergence from the traditional UTXO model in which each full node in the network has a copy of the UTXO pool that tracks all UTXOs on the blockchain. By contrast, the present disclosure distributes the UTXO pool across a plurality of validating resources, each having a UTXO pool that is a subset of the blockchain's entire UTXO set. Each validator's UTXO pool comprises the UTXOs of transactions which make up the Merkle tree sub-portions that it has been tasked with validating.

In accordance with such an approach, each time a new block needs to be validated it can be implemented in a similar fashion to an SQL transaction log, in that every command, event and item relating to the database is recorded in the log. The term "database log" will be used herein to avoid confusion arising from the use of the term "transaction" as known in relation to blockchains, but we use the term "database log" to include terms such as "transaction journal", "transaction log" etc. Essentially, the database log can be interpreted as a history of actions executed by a database management system, providing a record of all changes that have occurred in respect of the state of the database, as known in the field of computer-based databases (See en.wikipedia.org/wiki/Transaction_log).

The use of an ordered, historical database log means that the entire UTXO pool can be constructed by executing the log's history in its original order. Advantageously, this ensures that a copy of the database can always be (re) generated when required, and separate copies of the data do not need to be stored. Data integrity is ensured, and fewer storage resources are required. Each UTXO pool can be stored, maintained and processed separately. Also advantageously, SPV techniques facilitate the creation of separate UTXO databases for each validator given that SPV techniques operate on pruned portions of Merkle trees.

Transactions (TXs) within the database can be structured in a variety of ways, although a particularly advantageous approach is to structure them according to identifiers which comprise a concatenation of the block ID and the transaction ID (block_ID||TxID). The block ID and the transaction ID are both 256 bit hashes, resulting in a 512 bit concatenation field structure that is secure and collision free.

Structuring transactions in this way provides a fast, efficient look-up mechanism. Transactions can be sorted by block_ID such that all transactions having the same block_ID are located together in the database. Thus, when a validator requires a transaction (e.g. to check whether a UTXO of the transaction has been spent), the validator can locate the transaction in the database first by searching for the corresponding block_ID, and then the corresponding TxID. This has the effect that the search is confined to the relevant section of the database. This efficiency reduces the time, processing resources and energy required for search operations, providing a significant improvement over prior art A flag or marker is associated with each UTXO in a validator's pool, and indicates whether the UTXO is locked or unlocked. We may refer to this flag or marker as a "locking flag" for convenience. When a UTXO is marked as "locked", this serves as an indicator to validators in the group (i.e. elsewhere in the distributed validation node) that this UTXO is not available for spending. Conversely, when a UTXO is marked as "unlocked", this serves as an indicator to validators that the UTO can be spent. It functions, therefore, as a way of enabling a validator that has been allocated to verifying a transaction that spends the UTXO to signal to its peers that, assuming the transaction proves to be valid, it has been redeemed and is, therefore, no longer spendable. A "locked" state means that spending is permitted, whereas an "unlocked" state means that spending is prohibited.

This locking/unlocking flag can be a simple, small binary marker such as 0 for "locked" and "1" for unlocked. The marker mechanism is used internally by validators in the distributed node system, the marker is removed from the transaction prior to interacting with the blockchain so that the transaction conforms to the protocol rules.

In use, the validator inspects the outputs in each of the new transactions that have been allocated to it by the controller. Any unspent outputs (UTXOs) are added to the validator's UTXO pool i.e. it is recorded as an entry in the UTXO database. In the relevant database record for each new UTXO, the locking flag is set to "unlocked".

When the validator sees that a UTXO is being spent by a newly allocated transaction, it sends a message to every other validator in the plurality to inform them that this UTXO should also be locked in their respective pools. Essentially, the validator sends a communication to its peers indicating that it has seen a spend involving a transaction with a particular hash ID at a particular time. The other validators do not need to receive complete data for the entire transaction, as the transaction hash and a list of UTXOs that it spends is sufficient for them to identify the transaction in question and mark it as locked in their own database. Upon receipt of the message, each receiving validator checks whether the UTXO in question is in their UTXO pool. If it is, the state of the locking flag is changed to "locked". Thus, the lock prevents validators from allowing the same UTXO to be spent in a subsequent transaction. In the event that a new transaction does attempt to spend the same UTXO, a check of the locking flag will indicate that the second spend attempt is to be ignored. If the validator that sent the message determines that validation has failed and therefore the UTXO has not been spent, a further message can be sent out to the validator peers to this effect, indicating that the locking flag for the UTXO should be changed to the "unlocked" state. Once a valid spend has been completed, a message can be sent to this effect, and the locked UTXO can be deleted from the relevant UTXO pool.

In the embodiment described above, each validator has a single UTXO pool which comprises the UTXOs of all the transactions in all of the tree segments that have been allocated to it. However, in an alternative approach, the UTXO pool maintained by each validator may be divided/split/compartmentalised into/formed of multiple sub-pools, one per block. In this way, a single UTXO pool can be organised into a logical hierarchy. In yet another approach, one or more validators may be arranged in association with a respective plurality of UTXO pools, each plurality relating to UTXOs for a set of one or more tree segments. Thus, in some embodiments, validator(s) may organise UTXOs into separate UTXO pools for different individual tree segments, or according to some pre-defined criteria such as type of tree segment, or tree segments which fall within a given range etc. In such embodiments, the identifier may comprise a block ID which can be used to narrow down a search to a relevant UTXO pool, and then the search can proceed within that pool to (attempt to) identify the relevant transaction by its TxID. The skilled person will understand that in some embodiments, a mixture of these approaches can be used i.e. one or more validators within the distributed node may employ the single-UTXO-pool approach while other(s) are arranged to use multiple, separate UTXO pools, and/or UTXO pools which are organised into sub-pools, or any combination thereof.

This provides protection against "double spend" situations, in which a party attempts to spend the same UTXO twice. This provides a simple and secure locking mechanism that operates efficiently and quickly, regardless of the number or location of the validators in the system, and preserves the security and integrity of transfers implemented over the blockchain.

Distributed Mining

We now provide a detailed description of an aspect of the disclosure in which mining tasks and functions are separated from other operations that are typically associated with or performed by a "full node" on a blockchain network. This enables the mining tasks to be distributed and parallelised across different resources. This provides a different technical architecture and system arrangement compared to the prior art, and allows more flexibility in terms of placement or provision of the resources. For example, mining resources could be provided in geographical areas where a supply of renewable energy is available, making the network less reliant on expensive or environmentally costly energy sources.

As known in the art and illustrated in FIG. 11, a transaction has to be validated before it can be written to the blockchain. Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be added to the blockchain ledger, it must be i) validated by the first node that receives the transaction—if the transaction is validated, the node relays it to the other nodes in the network; and ii) added to a new block built by a miner; and iii) mined.

Traditionally, to mine a block the mining node selects unconfirmed transactions from its mempool, generates the coinbase transaction for the block, and forms a candidate block by hashing all the transactions in pairs to form a Merkle tree structure having a Merkle (hash) root. The Merkle tree represents all the transactions in the candidate block. The miner also determines a version number and current epoch time, and obtains the hash of the latest block on the longest chain of the ledger. The Merkle root and other values are concatenated to form a block message BM.

The miner then attempts to solve the PoW challenge by finding an integer value (the nonce) that, when appended to the block message to produce a full block header, produces a hash with a specified number of leading zeroes. If the attempt fails to produce a qualifying hash, the miner repeats the calculation using a different nonce. If it finds a nonce that succeeds in producing the required number of leading zeroes, it sends the candidate block, including its full header, out to the blockchain network to be verified by the other nodes. The nonce, therefore, provides proof that the miner has spent energy, effort and time in finding a solution to the challenge.

Therefore, in the traditional approach, the miner selects the transaction, generates the candidate block, generates the PoW and the full block header. In contrast to the traditional approach in which these functionalities are performed by the same entity, in the presently disclosed approach these functions are distributed and parallelised across different processing entities. This allows for verification and enforcement of pre-specified authorisation criteria prior to performing and/or completing the PoW calculation.

In a preferred embodiment, the Merkle structure of a block allows the various functions of the validation and mining processes to be separated out and handled independently by different computing resources. These resources can be located anywhere in the world and may operate in isolation or in combination with one another. Collectively, they can form "distributed nodes" wherein different node components specialise in one or more functionalities relating to validation and/or mining of blockchain transactions and blocks.

The presently disclosed approach concerns the separation of the Proof-of-Work (PoW) calculation from the validation effort, transaction processing and other tasks typically associated with mining by the traditional full node. This means that the PoW provider does not need to perform any verification tasks and, conversely, the validation node can delegate the PoW calculation to a specialist, dedicated resource that can be located anywhere in the world.

Figure 2:
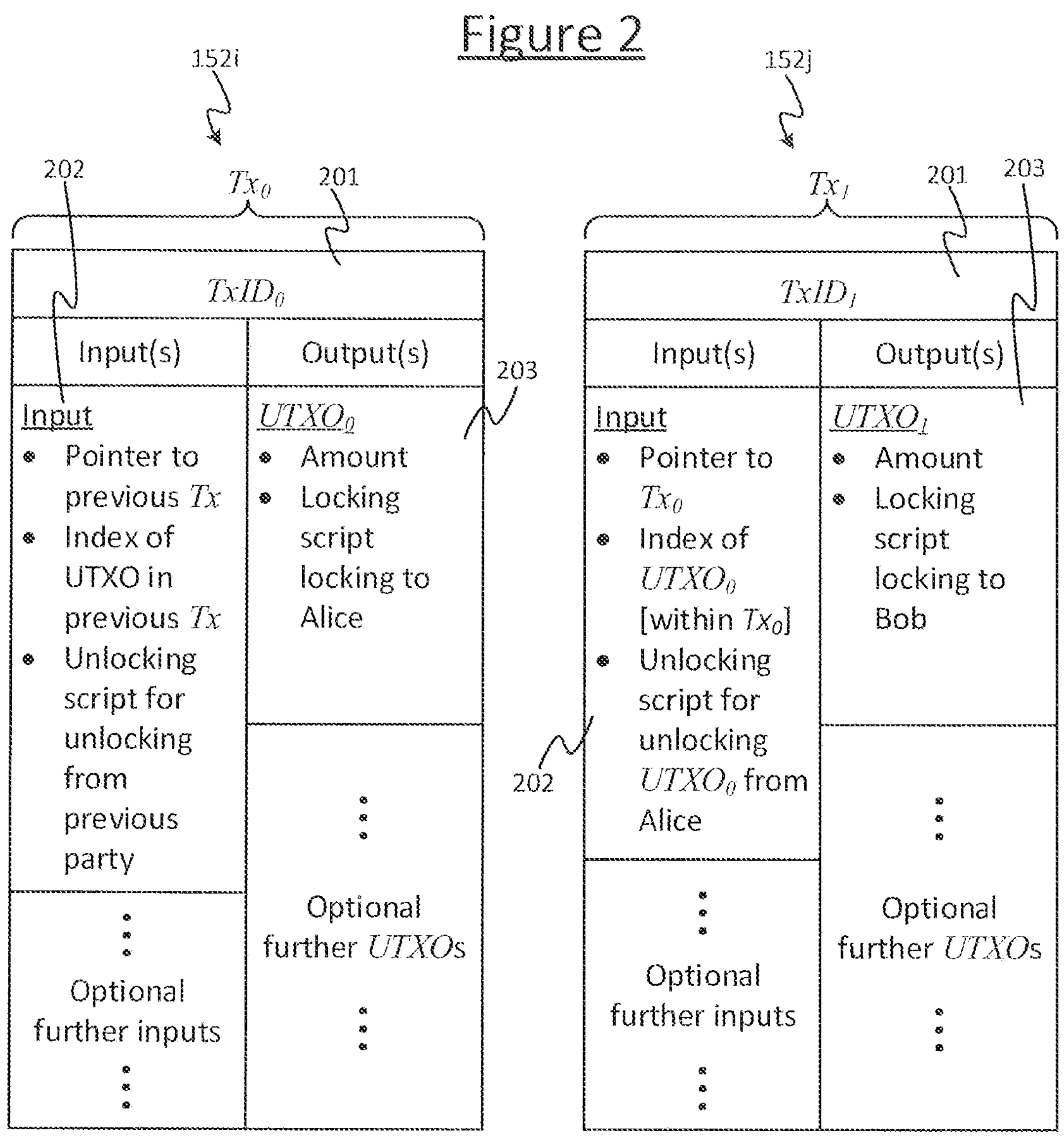
FIG. 2 schematically illustrates some examples of transactions which may be recorded in a blockchain.

Therefore, the disclosure represents a significant deviation from the traditional approach to validation which is described in more detail in the section herein entitled "Example technical environment for implementation of an illustrative embodiment of the disclosure", and with reference to FIGS. 1 and 2.

Figure 13:
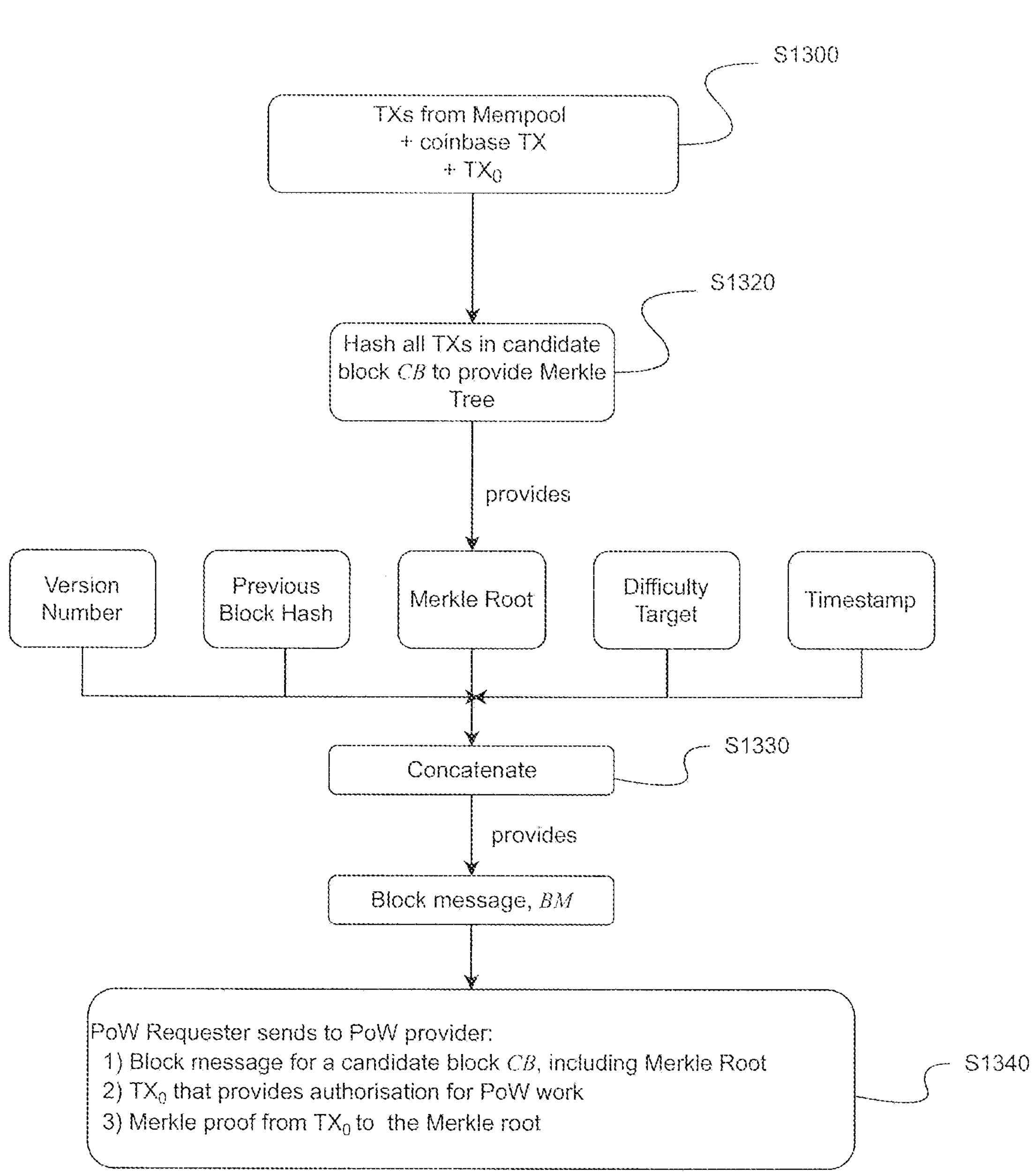
FIG. 13 shows an example of typical tasks performed by a PoW requester in accordance with a preferred embodiment of the disclosure.
Figure 14:
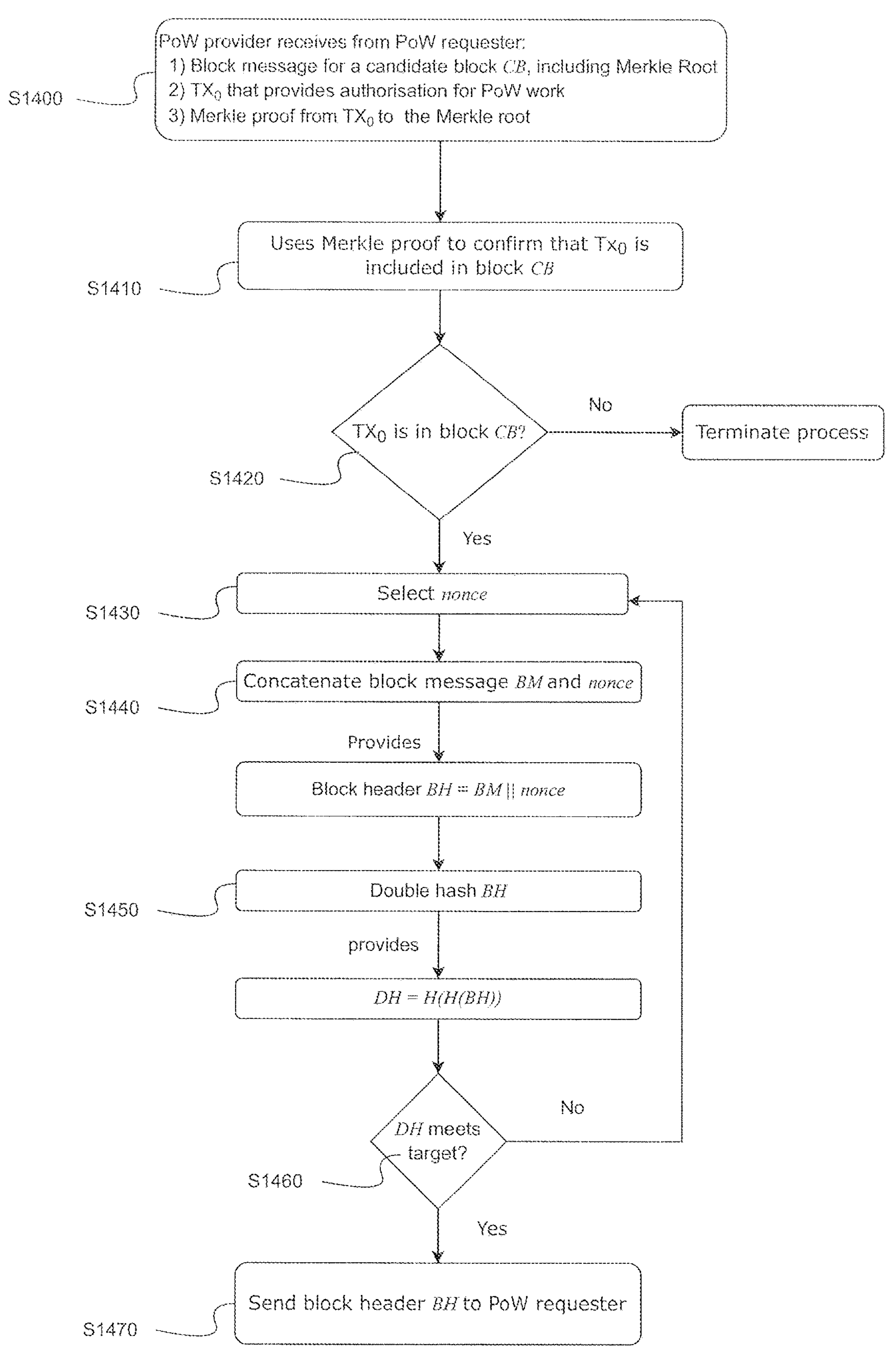
FIG. 14 shows an example of typical tasks performed by a PoW provider in accordance with a preferred embodiment of the disclosure.
Figure 15:
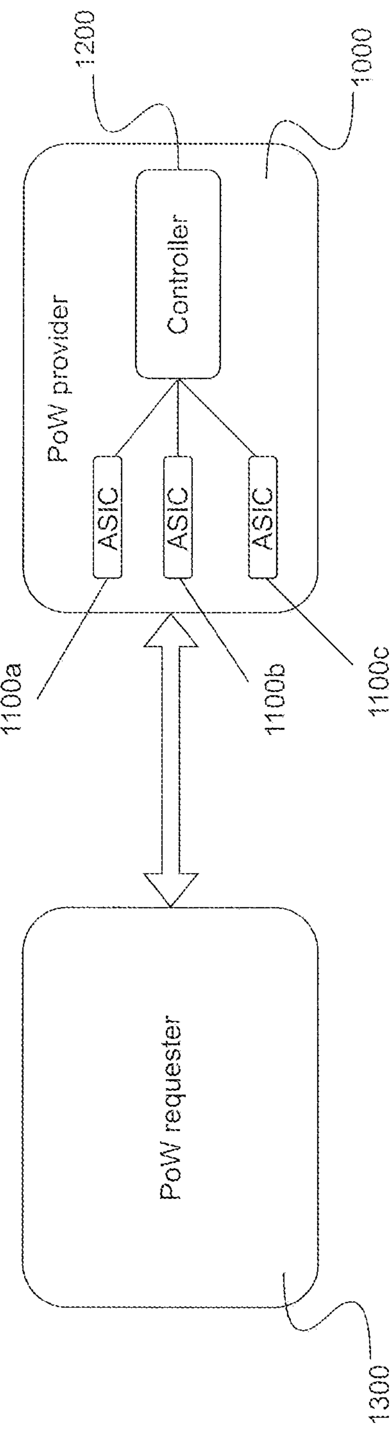
FIG. 15 illustrates a distributed mining node in accordance with an illustrative embodiment of the disclosure.

We turn now to FIGS. 10 and 12 to 15 which illustrate an embodiment of this aspect. In this approach, a distributed mining node 1000 is provided as shown in FIG. 15. Alternatively, this may be referred to as a "PoW provider". The PoW provider 1000 comprises at least one specialised PoW calculator that can also be referred to as a "hash machine" or ASIC. The PoW calculator comprises one or more integrated circuit chips (shown in the figures as 1100*a*, 110*b*, 1100*c*) that are arranged to mine a cryptocurrency in accordance with an associated protocol. Calculators 1100*a* to 1100*c* may be arranged to mine Bitcoin using the SHA-256 algorithm. Other algorithms may be employed for other cryptocurrencies such as, for example, ETHASH for mining Ethereum.

As shown in FIGS. 10 and 15, the PoW provider 1000 is in communication with a PoW requesting resource 1300 that is arranged to send a request to the PoW provider to request generation of a valid nonce (or, preferably, a complete block header) for a given plurality of transactions. The term "request" as used herein is intended to include "instruct" and/or "initiate". Therefore, the request may comprise or be an instruction or initiation of a PoW generation. We will use the term "request" for simplicity.

In alternative wordings, the PoW requesting resource 1300 may be referred to as a validation and/or mining resource or node, or simply a "PoW requester". In a preferred embodiment, the requesting resource 1300 may be distributed and facilitate the parallelisation of validation and/or mining operations. The requester 1300 and may be substantially as described herein and illustrated in FIG. 7 with reference to the validation node 700. In other embodiments, though, the requesting entity may take any suitable alternative form, and may be any entity that requires the generation of a PoW (nonce or block header).

To request the PoW, the PoW requester 1300 sends the PoW provider 1000 at least some of the information needed for the construction of a block header for a candidate block of transactions. The information sent from the PoW requester may be referred to as a "block template" or "block message" and may include at least the root for the Merkle tree that represents all of the transactions in the block. The block template may also include other information to be used by the PoW provider to generate a block header for the transactions, such as version number, previous block hash, difficulty target and/or time stamp, or one or more of these data items may be calculated or obtained by the PoW provider. For example, the PoW provider may obtain, retrieve or select a version number, or may obtain the previous block hash from the network. It should be noted that the PoW provider does not need to receive the whole block from the PoW requester; it simply needs sufficient, minimal information, as specified by the protocol, to combine with a selected nonce and attempt to solve the PoW challenge. It must, however, receive the Merkle root for the transactions that the PoW requester wishes to include in the block as this cannot be determined by the PoW provider 1000.

In some embodiments, the PoW provider may comprise a controller 1200 which is arranged to coordinate the activities of the PoW calculator(s). In some embodiments, the functions of the PoW provider 1000 and/or controller 1200 can be implemented in an ASIC or hash machine 1100. FIG. 15 shows the controller as part of the same entity as the PoW calculators but this should not be construed as necessarily meaning that the controller and the ASICS are implemented within the same hardware or device. They may be provided as physically separate devices but form a PoW provider 1000 by being associated with one another logically or electronically, and/or by being in communication with one another.

The controller 1200 may perform such operations as selecting a nonce or range of nonces for a given calculator (1100*a* to 1100*c*) to operate on, obtaining any necessary information for the PoW calculation that is not provided by the requester and/or checking the authorisation criteria as explained below. Calculators 1100*a*, 1100*b* and 1100*c* may be arranged to operate on different nonce ranges for the same candidate block. In some embodiments, however, the PoW requesting resource may allocate nonce ranges, and that the functions of the PoW provider 1000 and/or controller 1200 can be implemented in an ASIC 1100. In yet other embodiments, the PoW requester may allocate a nonce range.

In addition to the block template, the PoW requester can provide further data to the PoW provider. This could be any kind of data that the PoW provider needs in order to confirm the fulfilment or otherwise of at least one pre-requisite rule or criterium. This at least one pre-specified rule or criteria will be referred to hereafter as the control criteria for ease of reference. The control criteria must be met before the PoW provider begins, continues and/or completes its PoW calculation effort. If the (control) data provided to the PoW provider meets the control criteria, the request for PoW generation may be deemed by the PoW provider as authorised, legitimate and/or permitted. The control criteria may be predetermined at, by or on behalf of the PoW provider. It may be agreed between the PoW requester and the PoW provider, or their respective associated entities.

In a preferred implementation, the control data is included in a transaction that forms part of the block that the PoW is to be calculated for. The control data can be evaluated or checked by the PoW provider against the control criteria to ensure pre-authorisation or agreement between the parties, or legitimacy of the request from an authorised requester. For example, the PoW provider may require that the block includes a transaction ($TX_0$) that transfers a portion of cryptocurrency to a particular address. If this criterium is not met, the PoW request will not be deemed to be permitted and it will not attempt to calculate the required PoW. To assist in the checking process, the PoW requester may provide, as part of the data that it sends to the PoW provider, an SPV-style proof that the PoW provider can use to confirm that a transfer to the pre-specified address will be made if the block is successfully mined and added to the blockchain.

In another example, the pre-requisite might be that $TX_0$ is signed by an authorising party.

In other examples, the control criteria may be that $TX_0$ contains metadata that the PoW provider can check and confirm. For example, the metadata may comprise a secret such as a cryptographic key, or a password/code or some other data that the PoW provider can use to confirm that it is authorised or permitted to generate the PoW for or on behalf of the requester.

In some implementations, $TX_0$ could also include instructions on where the PoW is to be sent. For example, it may by default be sent back to the PoW requester or it may be sent to another entity as specified in the metadata or some other part of the transaction. The metadata could include a flag or other identifier for directing which destination the PoW should be sent to, or which party is authorising the PoW request. The flag or identifier or password etc may be known only to the PoW provider and/or requester. This can be advantageous in scenarios where a PoW provider can receive requests from multiple, unrelated requesters.

In some cases, inspection of $TX_0$ could trigger an event by the PoW provider. For example, data in the transaction could cause a balance or account to be updated e.g. because the PoW provider is able to identify the request as being received from a particular, authorised requester that has an account with the PoW provider. Additionally, or alternatively, a PoW provider may not wish to provide more than a specified number of PoWs for a given requester, possibly within a given period of time, and may use $TX_0$ to determine whether or not the threshold has been met. Additionally, or alternatively, an alarm, alert or other communication may be initiated by the PoW provider based on the data provided in $TX_0$.

In yet other examples, the control criteria could be that $TX_0$ spends a sufficient quantity of cryptocurrency, possibly to a pre-specified address, and the PoW could check that the outputs of $TX_0$ to ensure that the control criteria are met.

In yet other examples, the inputs of $TX_0$ could be inspected to ensure that funds from illegitimate or non-approved sources are not transferred and received. For example, if a PoW provider does not wish to receive requests from certain parties e.g. because they are known or suspected to be associated with illegal activities, the PoW can decline to generate the requested PoW. Thus, the disclosure can provide solutions for ensuring compliance with legal or regulatory requirements, and can provide measures for preventing fraud/criminal behaviour.

In essence, the invention provides an authorisation mechanism for parallelising and distributing the PoW calculation in a manner that is efficient and does not require trust between the participating parties. The control criteria may be checked separately from the PoW calculation, possibly in parallel with it. In other words, when a request is received from a PoW requester, the PoW provider may start work on the PoW calculation at substantially the same time as it begins to check the received data against the control criteria. If the received data fails to meet the control criteria, the PoW provider can halt work on the PoW calculation; or, if it meets the criteria, it can allow the work to continue.

This provides the advantage on the assumption that the request is legitimate and authorised, the PoW can be returned as swiftly as possible to the requester/specified destination. As blockchain mining involves a race to submit the first valid block to the network, this can provide a time-critical advantage.

In Use Example

With particular reference to FIGS. 13 and 14, we now explain how the disclosure may be put into practice in accordance with one illustrative embodiment.

From the PoW requester's perspective in FIG. 13:

Step S1300: the PoW requester 1300 selects unconfirmed transactions (TXs) from its mempool, and generates the coinbase transaction (if the relevant protocol requires or permits one). In other cases, it may receive the set of transactions from another source which provides them to the PoW requester.

The PoW requester also generates or obtains at least one transaction $TX_0$ which is arranged to fulfil an authorisation requirement specified by the PoW provider or an associated entity that authorises and/or directs the activities of the PoW provider. In our illustrative example, the requirement is that $TX_0$ includes at least one output which transfer(s) assets to at least one specified address.

Step S1320: the PoW requester (or an associated resource) hashes all of the transactions in pairs to produce a Merkle tree for the set of transactions. The Merkle Tree has a root R.

Step S1330: in some embodiments, the PoW requester may generate a block message BM (template) by concatenating the Root R with other information required for generation of a block header e.g. a version number, previous block hash, difficulty target and/or timestamp). In another embodiment, at least one, some or all of these values may be obtained, retrieved or generated by the PoW provider instead of being provided by the PoW requester.

Step 1340: the PoW requester sends the root R (potentially as part of block message BM) to the PoW provider. The validator also sends a Merkle proof which the PoW can use to prove that $TX_0$ is included in the block of transactions represented by the tree that R is the root of. This Merkle proof comprises the parts of the tree that, when hashed together in pairs along with $TX_0$, allows the prover to arrive back at the root. In this way, the PoW requester needs only to send the PoW provider the root R, the authorisation transaction $TX_0$, and the minimal set of transactions which can be used to generate the path from $TX_0$ to R. The PoW provider can (in FIG. 15) perform an SPV style verification to check that the PoW requester has met the authorisation criteria.

From the PoW provider's perspective in FIG. 14:

Step S1400: The PoW provider 1000 receives a Merkle root for a set of transactions from the PoW requester. These transactions will form the body of the block that the PoW is to generate the PoW for on behalf of the PoW requester. As explained above, the set of transactions may comprise one or more transactions selected from a mempool, at least one authorisation transaction $TX_0$, and a coinbase transaction if relevant. The Merkle root R may be received from the PoW requester as part of a complete or incomplete block message. The PoW provider also receives at least one transaction $TX_0$ that is arranged to fulfil at least one authorisation requirement, and the part of the set of transactions which serves as a Merkle proof for confirming that $TX_0$ is included in the set.

Step S1410: The PoW provider uses the Merkle proof to perform an SPV style local verification to confirm that $TX_0$ is in the set, and check that the PoW requester has fulfilled the authorisation requirement(s).

Step S1420: If the verification fails, then the PoW is not authorised to proceed with the PoW calculation. It terminates the process by either not instructing the PoW calculator(s) to start work on the discovery of a valid nonce or, if they have already begun to do so, instructs them to stop. No block header will be sent to the PoW requester. An alert, signal or message may, however, be sent to the PoW requester or another destination to indicate that authorisation for the PoW generation has failed.

In the alternative, if the verification succeeds then PoW generation is authorised to proceed Step S1430: to generate the PoW the calculator (1100*a*, 1100*b* or 1100*c*) selects or receives a nonce. This may be randomly generated, or may be selected from a range of allowed nonces specified to the calculator by the controller 1200.

Step S1440: The calculator concatenates the block message with the selected nonce. It should be noted that if the PoW requester has not provided a complete block message as explained above, the PoW provider may retrieve, obtain or generate any additional data required for generation of a block header in accordance with the relevant blockchain protocol. Concatenation of the block message and the nonce provides a block header BH.

Step S1450: Block header BH is then double hashed

Step S1460: the result of step S1450 is then compared against the difficulty target set by the protocol; if it does not provide the requisite number of leading zeroes, the block cannot be added to the ledger so another nonce is selected and the process returns to step S1430.

Step S1470: If, however, the selected nonce does produce the required number of zeroes, the block can be validly mined and so the block header, including the valid nonce, is sent to the PoW requester or another specified destination.

Although not shown in the figures, the PoW requester or another entity can then submit the block to the network for inclusion on-chain. Importantly, as the PoW generation has been outsourced to the specialist, dedicated PoW provider, the PoW requester can process, delegate or coordinate other tasks such as validation operations in parallel with the PoW calculation. This provides technical improvements in terms of throughput of transactions and efficiencies of resources.

Advantages:

Aspects of the disclosure provide numerous advantages, including but not limited to:

1. The effort and costs of calculating the PoW calculation can be delegated and outsourced by the PoW requester to any PoW providing service(s) of their choosing.
2. These can even be providers that the validator has no existing relationship with. Instead, the relationship between the PoW requester and the PoW provider is governed by fulfilling at least one pre-specified criteria which serves as pre-authorisation to undertake the PoW effort.

In some implementations, the PoW requester sends a Merkle Proof that the PoW provider can use to ensure, before commencing the PoW calculation effort, that the necessary criteria have been met.

3. This allows an extra layer of pre-authorisation to be built into the PoW process, because the PoW requester and the PoW provider can both prove that the candidate block contains a transaction that fulfils the pre-specified or agreed conditions. If the block is successfully mined and the transaction is included in the blockchain, the transaction and its transfer of assets will be immutably recorded. In cases where the authorisation criteria requires transfer to a specified address the PoW provider can be assured that the desired transfer will be made if the block is written to the ledger.
4. Fulfilment of the pre-specified criteria is, therefore, provably embedded in the data that is to be processed by the PoW provider. It is not sent separately from the PoW requester to the PoW provider. This provides a more efficient solution compared to approaches involving separate communications.
5. As this solution allows for distribution of mining and validation tasks, the transaction processing functions are separated from processing of the block header. Therefore, the hash machine/ASIC component(s) can be sited in one or more locations while the transaction processing can be performed in other(s). Locations for the different functions can be selected in accordance with different needs such as energy resources or network infrastructure. For example, as the PoW provider only needs to return a small (80 byte) block header to the PoW requester, it can be sited in an isolated location that allows for use of renewable energy sources even if there is limited access to the Internet. The block header can be sent using a mobile phone with low bandwidth. The transaction processing, on the other hand, can be performed in a location that has good access to the Internet, such as a major city. Together, this allows for a more versatile and efficient distribution of tasks, including the use of sustainable, environmentally friendly energy supplies.
6. Additional security can be provided in that $TX_0$ can be compared against the control criteria to ensure that only requests from legitimate requesters are acted upon. This can avoid exploitation by unauthorised parties, malicious parties such as attackers and/or provision of PoW work for parties potentially associated with undesirable or illegal activities and thus participation in criminal activity.
7. Improved authorisation and control techniques for blockchain mining, because the requester is able to identify themselves in a variety of ways via the control data supplied via $TX_0$.

Illustrative System of a Possible Embodiment

Figure 8:
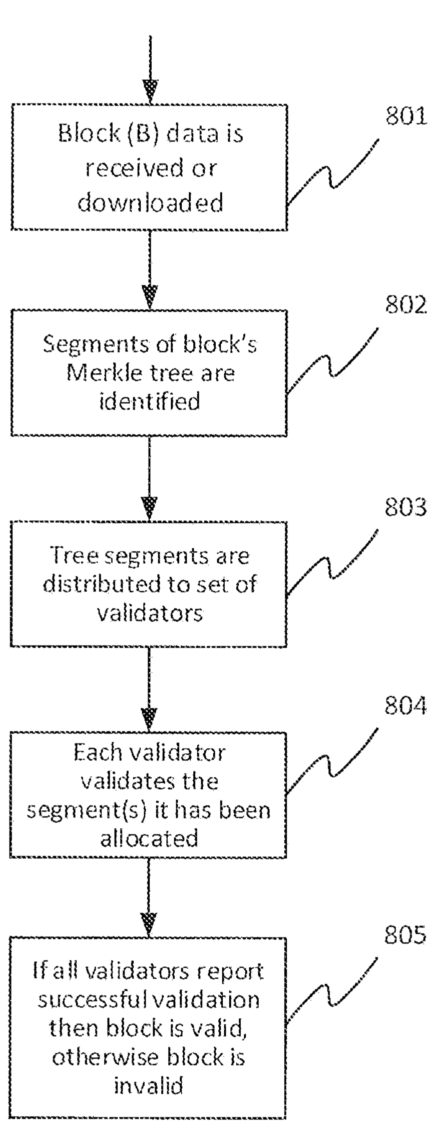
FIG. 8 is a flow chart showing, at high level, the steps involved in an illustrative method of the disclosure.

FIGS. 7 and 9 illustrate an example system 700 for implementing at least some of the described embodiments. FIG. 8 illustrates a flowchart of example steps which may be taken in (a high-level view of) a method of the disclosure.

The system 700 may be a closed system in the sense that it may be associated with an organisation and form part of a larger proprietary system. In such cases, its data e.g. transactions, may be received from other components within the organisation's wider system and its results and outputs may be sent to internal destinations. Additionally, or alternatively, system 700 may be arranged to interface with a variety of entities, some or all of which may be located outside the organisation. In such cases, system 700 may be arranged to provide validation functionalities as a service. For example, system 700 may be arranged to interact with the blockchain network to obtain the data that it requires. Additionally, or alternatively, it could interact with entities that wish to use its validation services. Thus, system 700's activities could be solely internal with respect to a particular organisation or entity, or open to interactions with external entities to provide validation services to other parties, or a combination of the two. Communications between other internal or external entities may be coordinated by one or more interface or communication components, shown as 902 in FIG. 9.

As shown in FIGS. 7 and 9, the system 700 includes a controlling entity 702 (or simply, "controller") and a plurality of validating resources 704, also referred to herein as simply "validators". Only four validators 701*a-d* are shown in FIG. 7, but in general the system 700 may comprise any number of validators. Moreover, the controller 702 is shown in FIGS. 7 and 9 as distinct from the validators 704, but it is not excluded that the controller 702 may comprise or be comprised by one of the validators 704. As explained above, each validator may comprise one or more processing resources, and may comprise its own controller for coordination of its own internal activities. There is no technical or logical limit to the hierarchical levels that can be implemented in this way. FIG. 7, however, shows only one (top) level of such a hierarchy for simplicity and ease of understanding.

As shown in FIG. 7, the controller 702 obtains a set of transactions. The transactions can be received across an electronic channel or network from a sending resource. The sender may be any entity which wishes to perform a validation check of some kind, internal or external to the system's organisation as explained above. For example, this could be a full node on a blockchain network such as node 104 in FIG. 1, or a digital wallet, or a merchant/SPV node wishing to perform a local check relating to a blockchain-implemented transfer made between parties. Interface(s) 902 may facilitate the transmission of data between the system 700 and sources external to the system.

The transactions form, or may form, a block of transactions. The transactions may be obtained from a single resource (e.g. from a block of the blockchain) or from different resources (e.g. one or more users, one or more blockchain nodes, etc.). The transactions may be obtained prior to them having been published on the blockchain, i.e. before being recorded in a block. Alternatively, the transactions may be obtained after having recorded on the blockchain.

The controller 702 allocates a respective subset of transactions to each validator 704 as described herein. Each subset of transactions forms at least part of a respective portion of a Merkle tree generated based on the full set of transactions, and is linked by a respective common inner node of the Merkle tree. In the example of FIG. 7, transaction subset A is allocated to validator A, transaction subset B is allocated to validator B, transaction subset C is allocated to validator C, and transaction subset D is allocated to validator D. Having been allocated a subset of transactions, the validators 704 then process their respective subset. In some embodiments, this involves each validator 704 validating its respective subset of transactions. To do so, the controller 702 may transmit the relevant transactions to the respective validators 704. The validators 704 may communicate back to the controller 704 to indicate that each of their respective subset of transactions is valid or that at least one transaction is not valid.

At least one but preferably some or all of the validators 704*a* to 704*d* have access to their own UTXO pools shown as 901*a* to 901*d* in FIG. 9. This pool comprises a storage facility such as the database described above, and potentially with the advantageous indexing structure comprising a concatenation of the block ID and the transaction ID. In FIG. 9 the pools are shown as included within the respective validator but the skilled person will readily understand that they may also/alternatively be provided as external to the validator but in communication therewith.

In one or more embodiments, the disclosed process may include a block-level validation stage, during which an incoming new block is tested against block-level criteria. Example block-level criteria are described above and generally relate to prescribed formatting requirements and characteristics or limits applicable to the block itself, as opposed to the transactions within the block. Examples include the block size, the block header structure or content, and similar criteria. Such operations may be performed by the controller, or a component of the controller, or by another system component.

In some embodiments, the method may further include a UTXO uniqueness confirmation module which is operative to evaluate whether each of the inputs, i.e. each UTXO, to a transaction in the new block is unique. If the same UTXO appears more than once as an input in the new block, it indicates a potential double-spending problem and violates the UTXO uniqueness criteria. If the UTXO uniqueness confirmation module identifies a UTXO that is referenced more than once among the transaction inputs in the new block, then it may output an error signal or other interrupt to indicate that the block is to be rejected.

Assuming that the new block does not get rejected, i.e. that all the UTXO inputs are unique, then the Merkle tree segments can then be identified and their associated transactions allocated among the set of validators. The identification process may be performed by a component such as segment identification unit 903, shown in FIG. 9. The allocation process may be performed by a segment allocation unit, shown as 904 in FIG. 9. The allocation unit 904 may employ any one of a number of possible allocation schemes for distributing the block segments amongst the individual validators, but in an advantageous approach the allocation scheme may be aimed at load balancing as described above. The allocation unit 904 may comprise (or be in communication with) a load balancing unit 905. Although this is shown as a separate, associated component of the system in FIG. 9, it other embodiments load balancing unit may be part of the allocation unit 904, or may be separate relative to the controller 702. Any combination of components may be readily employed.

The individual validators validate the transactions associated with the segment(s) they receive against transaction-level validation criteria. The validators do not require synchronization paradigms between them as they each work independently on verifying that the transactions that they have been allocated are valid. Each validator outputs a result confirming the validity of its allocated transactions. The results are added or accumulated to confirm that all the transactions in the segment are valid. In the event that one of the validators identifies a non-compliant transaction, i.e. an invalid transaction, then it may issue an output, such as an interrupt or other signal, to indicate that there is an invalid transaction. That interrupt or signal may be sent to the other validators or to the controller or another system component so that they can immediately cease testing their respective transactions and not waste further resources on validating transactions within a block that is to be rejected.

In some examples, the system may be arranged to check block-level criteria. This may be performed prior to allocation of the segments to the validators, although it will be appreciated that the block-level validation stage may occur after the transaction-level validation testing by the validators or, in some instances, in parallel with the transaction-level validation testing.

Reference will now be made to FIG. 8, which shows, in flowchart form, one example of a method of validating a block. The block contains a plurality of transactions, each transaction references one or more inputs, and each input is a UXTO (except in the case of a coinbase generation transaction). The method is implemented using suitable hardware and processor-executable instructions within a node on the blockchain network.

In operation the distributed validation node 700 receives new block data at step S801. This may be an entire block, or in the case of an SPV-related validation, it may comprise only partial data required for performing an SPV check. We will refer to this as data as "the block" for convenience. The new block that is to be validated may be received from a mining node on the blockchain network that generated the new block and completed the proof-of-work, or it may be received from a merchant node that wishes to perform an (SPV) check, or it may be received from a wallet such as an SPV wallet. The new block may be received from another (non-mining) node in the network. In some examples, the distributed validation node 700 validates the block before forwarding it to any other nodes in the network. As discussed above, the validation of the new block may include confirming that the block meets certain protocol-based criteria, and/or other criteria that may be specified and required within a given implementation.

At step S802, the system 700 identifies chunks of the block's Merkle tree. At S803 the segments are distributed to a plurality of validators, and S804 the validators process their respective subsets of transactions substantially in parallel and independently of each other. At S805, the validators signal to the controller whether validation has been successful or has failed.

It should be noted that the term "processors", when used in connection with the description of parallel processors herein, does not necessarily mean physically distinct microprocessors and may include any hardware or software implementation that enables parallel processing resources capable of carrying out processor functions independently and in parallel. The parallel processors may include one processor having multiple cores. In some instances, the parallel processors may include multiple separate processing units. The parallel processors may or may not share a physical memory. Each parallel processor, howsoever implemented, has a software or hardware mechanism for signalling, such as to output a signal in response to identifying an invalid transaction. The implementation of the parallel processors also includes providing for the requisite data transfer mechanism, in software and/or hardware, to route the allocated transaction data to the respective processors for local processing.

Enumerated Clauses

Embodiments of the present disclosure are provided in the following enumerated clauses for the purpose of illustration, and without limitation.

Features mentioned below in respect of one set of enumerated clauses or aspect of the disclosure are not intended to be limited in such a regard and any feature(s) mentioned in respect of one set of clauses may be incorporated into one or more of the other sets of clauses.

Clause Set 1:

Clause 1.1: A computer-implemented method of processing (e.g. validating) at least a portion of a blockchain block that comprises a plurality of blockchain transactions and a root of a Merkle tree for the block.

The method may comprise:

- allocating respective subsets of the blockchain transactions to a plurality of processing (e.g. validating resources), wherein each respective subset provides a respective portion of the Merkle tree and is represented by a respective inner node of the Merkle tree; and/or
- using the plurality of processing (e.g. validating) resources to process (e.g. validate) their respective subsets of blockchain transactions.

Additionally, or alternatively, the method may comprise:

- sending or receiving at least a portion of a blockchain block that comprises a plurality of blockchain transactions and a root of a Merkle tree for the block. The portion of the blockchain block may be sent from a sending resource to a receiving resource. It may be sent across a network e.g. the Internet. The method may comprise the step of processing the portion of the blockchain block at the receiving resource. The receiving resource may be referred to as a processing or validating resource. The portion of the blockchain block may be sent using an IPv6 multicast transmission. At least one, some or all of the plurality of processing resources may be members of an IPv6 multicast group. The sending resource may comprise a network device. The network device may be operative to send IPv6 multicast communications to a multicast address. MLD snooping may be enabled at the network device. This provides efficiency in terms of traffic on the network as the sending resource can selectively send the portion of blockchain block to specific receiving resources (e.g. resources within the plurality of processing resources). Network traffic is reduced, energy and processing resources are not wasted by sending data packets to all resources on the network, including those which do not need or wish to receive the data. It also improves security because it avoids the possibility of Denial of Service (DOS) attacks, and it also facilitates scalability of the blockchain network by allowing faster throughput of transactions due to lower levels of network congestion.

The term "validator" may be used interchangeably with "validating resource". "Validator/validating" may be used herein for convenience instead of "processor/processing". The plurality of validating resources may form a distributed validation node. At least one of the plurality of validating resources may comprise one or more processing resources. Additionally, or alternatively, one or more of the plurality of validating resources may comprise a validator controller component substantially as described herein. At least one or some of the validating resources within the distributed validation node may share i.e. subscribe to a common IPv6 multicast address.

The respective inner node may be a segment root. In other words, an "inner node" is a node in a Merkle tree that is neither the root node of the entire tree nor a leaf node. The transactions in each subset may share a respective common inner node.

In an alternative wording, each subset may comprise at least two transactions which are associated with a common node in the Merkle tree such that the subset provides and/or is represented by a (sub)portion of the Merkle tree. The common (inner) node may be a segment node or root substantially as described herein. The portion of the Merkle tree may be a "segment" substantially as described herein.

Clause 1.2. A method according to clause 1.1, wherein validating the blockchain block and/or a subset of blockchain transactions comprises:

- i) validating and/or verifying at least one blockchain transaction; and/or
- ii) performing a Simplified Payment Verification (SPV) process; and/or
- iii) confirming whether a given blockchain transaction (Tx) is contained within the blockchain block; and/or
- iii) generating a hash of at least one of the blockchain transactions, using the hash to construct a Merkle path and/or checking whether the hash matches a transaction identifier (TxID) in a header of the blockchain block.

Clause 1.3. A method according to clause 1.1 or 1.2, wherein:

- at least one of the subsets of blockchain transactions comprises an identifier that is associated with, identifies and/or represents the subset.

Clause 1.4. A method according to clause 1.3, wherein:

- the identifier facilitates calculation of the position of the at least one subset within the Merkle tree.

Clause 1.5. A method according to clause 1.3 or 1.4, wherein:

- the identifier comprises part of a hash of a blockchain transaction within the at least one subset of blockchain transactions.

Clause 1.6. A method according to any preceding clause, wherein:

- the step of allocating the respective subsets of blockchain transactions to the plurality of validating resources comprises matching the respective subsets to respective validating resources based on respective identifiers associated with the subsets of transactions.

Clause 1.7. A method according to any preceding clause, and further comprising the step:

- i) downloading at least one subset of blockchain transactions to at least one of the plurality of validating resources; and/or
- ii) sending at least one subset of blockchain transactions to at least one of the plurality of validating resources Clause 1.8. A method according to any preceding clause, wherein:

- the Merkle tree comprises a binary tree or a mesh of hashes of the plurality of blockchain transactions.

Clause 1.9. A method according to any preceding clause, and further comprising the step:

- identifying and/or determining the subsets of blockchain transactions within the plurality of blockchain transactions.

Clause 1.10. A method according to any preceding clause wherein:

- at least one of the plurality of validating resources is, or comprises, one or more of the following:
- a virtual machine, a server, a GPU-based computing resource, a processing thread, and/or a multiprocessor system.

Clause 1.11. A method according to any preceding clause wherein:

- i) the at least two transactions are siblings in the Merkle tree; and/or
- ii) the common node is parent or an ancestor of the at least two transactions.

Clause 1.12. A blockchain validating system operative to validate at least a portion of a blockchain block that comprises a plurality of blockchain transactions and a root of a Merkle tree for the block;

wherein the system comprises a plurality of validating resources, each comprising:
 - a processor; and
 - memory including executable instructions that, as a result of execution by the processor, causes the system to perform the computer-implemented method of any preceding clause.

Clause 1.13. A non-transitory computer-readable storage medium having stored thereon executable instructions that, as a result of being executed by a processor of a computer system, cause the computer system to perform the computer-implemented method of any one of clauses 1.1 to 1.11.

According to another aspect of the disclosure, there is provided a computer implemented system arranged to perform any method step or combination of method steps described or claimed herein.

There is also provided a blockchain system (network) comprising a plurality of computer-implemented nodes, wherein each node in the blockchain network comprises:

a processor; and memory including executable instructions that, as a result of execution by the processor, causes the system to perform any variation of the computer-implemented method claimed or described herein.

The network may be arranged to operate using a blockchain protocol as described herein.

Additionally or alternatively, the disclosure may comprise a computer implemented method of download at least part of a blockchain block. The block may comprise a plurality of blockchain transactions and a root of a Merkle tree for the block. The method may comprise steps as set out in one or more of the following clauses:

Clause Set 2:

Clause 2.1 A computer-implemented method of receiving e.g. downloading at least part of a blockchain block that comprises a plurality of blockchain transactions and a root of a Merkle tree for the block; the method comprising:

allocating respective subsets of the blockchain transactions to a plurality of processing resources, wherein each respective subset provides a respective portion of the Merkle tree and is represented by a respective inner node of the Merkle tree; and using one, some or all of the plurality of processing resources to receive e.g. download their respective subset of blockchain transactions.

In accordance with one or more embodiments, the one, some or all of the processing resources may receive their respective subset of blockchain transactions from a providing (sending) resource. It may be sent across a network e.g. the Internet. The respective subset of blockchain transactions may be sent using an IPv6 multicast transmission. At least one, some or all of the plurality of processing resources may be members of an IPv6 multicast group. The sending resource may comprise a network device. The network device may be operative to send IPv6 multicast communications to a multicast address. MLD snooping may be enabled at the network device. This provides efficiency in terms of traffic on the network as the sending resource can selectively send the subset(s) of blockchain transactions to specific receiving resources (e.g. resources within the plurality of processing resources). Network traffic is reduced, energy and processing resources are not wasted by sending data packets to all resources on the network, including those which do not need or wish to receive the data. It also improves security because it avoids the possibility of Denial of Service (DOS) attacks, and it also facilitates scalability of the blockchain network by allowing faster throughput of transactions due to lower levels of network congestion.

Each respective subset may be represented by the respective inner node in the sense that the respective inner node may encode the respective subset. That is, the respective inner node may be generated based on (i.e. as a function of) the respective subset. Each transaction in a respective subset may be linked to the respective inner node by one or more hashing operations.

Clause 2.2. A method according to clause 2.1, comprising:

one, some or all of the plurality of processing resources sending their respective subset of blockchain transactions to a central storage location.

Clause 2.3. A method according to clause 2.2, wherein:

the respective inner node of the Merkle tree has a respective position in the Merkle tree, and wherein the method comprises:

arranging the respective subsets of blockchain transactions based on the respective position of the respective inner node of the Merkle tree.

Clause 2.4. A method according to any preceding clause, comprising:

one, some or all of the processing resource generating a respective candidate inner node of the Merkle tree based on the respective downloaded subset of blockchain transactions; and further comprising at least one of the following:

verifying that the respective candidate inner node matches the respective inner node of the Merkle tree; and/or;

verifying that the respective candidate inner node is a node of the Merkle tree by performing a Merkle proof based on the root of the Merkle tree; and/or sending the respective candidate inner node of the Merkle tree to one or more other processing resources.

Clause 2.5. A method according to any preceding clause, comprising:

using one, some or all of the plurality of processing resources to validate their respective subset of blockchain transactions.

Clause 2.6. A method according to clause 2.1, wherein:

validating the respective subset of blockchain transactions comprises:

i) validating and/or verifying at least one blockchain transaction; and/or ii) performing a Simplified Payment Verification process; and/or iii) confirming whether a given blockchain transaction is contained within the blockchain block; and/or iii) generating a hash of at least one of the blockchain transactions, using the hash to construct a Merkle path and/or checking whether the hash matches a transaction identifier in a header of the blockchain block.

Clause 2.7. A method according any preceding clause, wherein:

at least one of the respective subsets of blockchain transactions comprises a respective identifier that is associated with, identifies and/or represents the respective subset.

Clause 2.8. A method according to clause 2.7, wherein:

the respective identifier facilitates calculation of a respective position of the at least one respective subset within the Merkle tree.

Clause 2.9. A method according to clause 2.7 or 2.8, wherein:

the respective identifier is based on the respective inner node of the Merkle tree.

10. A method according to claim 9, wherein:

the respective identifier comprises part of the respective inner node of the Merkle tree.

Clause 2.11. A method according to any preceding clause, wherein:

the step of allocating the respective subset of blockchain transactions to the plurality of respective processing resources comprises matching the respective subsets to respective processing resources based on respective identifiers associated with the respective subsets of transactions.

Clause 2.12. A method according to any preceding clause, wherein:

the Merkle tree comprises a binary tree or a mesh structure of hashes of the plurality of blockchain transactions.

Clause 2.13. A method according to any preceding clause, comprising:

identifying and/or determining the subsets of blockchain transactions within the plurality of blockchain transactions.

Clause 2.14. A method according to any preceding clause wherein:

at least one of the plurality of processing resources is, or comprises, a virtual machine, a server, a GPU-based computing resource, or a multiprocessor system.

Clause 2.15. A blockchain processing system operative to download at least part of a blockchain block that comprises a plurality of blockchain transactions and a root of a Merkle tree for the block; wherein the system comprises a plurality of processing resources, each comprising:

a processor; and memory including executable instructions that, as a result of execution by the processor, causes or enables the system to perform the computer-implemented method of any preceding clause.

Clause 2.16. A non-transitory computer-readable storage medium having stored thereon executable instructions that, as a result of being executed by a processor of a computer system, cause or enable the computer system to perform the computer-implemented method of any one of clauses 2.1 to 2.14.

According to another aspect, there is provided a non-transitory computer-readable storage medium having stored thereon executable instructions that, as a result of being executed by a processor of a computer system, cause the computer system to perform any version of the computer-implemented method claimed or described herein.

Clause Set 3:

Clause 3.1. A computer-implemented method comprising the steps:

generating, storing and/or maintaining a first output repository for recording, searching and/or processing a plurality of unspent transaction outputs (e.g. UTXOs), each associated with a transaction (Tx) in a plurality of blockchain transactions (TXs) of a blockchain block;

wherein:

the plurality of blockchain transactions provides and/or is represented by a portion of a Merkle tree for the blockchain block.

Clause 3.2. A method according to clause 3.1, and comprising:

generating, storing and/or maintaining at least one further output repository.

Clause 3.3. A method according to clause 3.1 or 3.2, and further comprising: creating and/or maintaining a database log that comprises a history of actions, changes and events relating to the output repository.

Clause 3.4. A method according to any preceding clause, wherein:

the first and/or further output repository comprises at least one record associated with:

i) an unspent transaction output; and/or ii) a that is associated with a) an unspent transaction output and/or b) a transaction (Tx) in the plurality of blockchain transactions Clause 3.5. A method according to clause 3.4, wherein:

the at least one record comprises a record identifier having:

i) a block identifier (block_ID) associated with a blockchain block; and/or ii) a transaction identifier (TxID) associated with a transaction (Tx) in the plurality of blockchain transactions.

Clause 3.6. A method according to clause 3.5, wherein:

i) the record identifier comprises a function of the block identifier (block_ID) and the transaction identifier (TxID); and/or ii) a concatenation of the block identifier (block_ID) and the transaction identifier (TxID); and/or iii) the transaction of the plurality of blockchain transactions is associated with an unspent transaction output.

Clause 3.7. A method according to clauses 3.5 or 3.6, further comprising the step:

using the record identifier to search for, identify, access or insert the at least one record in the output repository.

Clause 3.8. A method according to any of any preceding clause, wherein:

at least one unspent transaction output (UTXO) in the plurality of unspent transaction outputs is associated in the output repository with a locking flag which:

i) indicates whether the unspent transaction output is available or unavailable for spending; and/or ii) is configurable between a first state indicative that spending of the unspent transaction output is allowed and a second state indicative that spending of the unspent transaction output is prohibited.

Clause 3.9. A method according to clause 3.8, the method comprising the step:

i) associating the unspent transaction output with the locking flag; and/or ii) changing a state of the locking flag from the first state to the second state, or second state to the first state.

Clause 3.10. A method according to clauses 3.8 or 3.9, comprising the step:

sending a communication from a first processing resource to at least one further processing resource to cause the at least one further processing resource to change the state of the locking flag associated with the unspent transaction output from the first state to the second state, or second state to the first state.

Clause 3.11. A method according to clause 3.10, wherein the communication comprises:

i) a transaction (TX), a transaction identifier (TxID) and/or a hash of a transaction (Tx); and ii) a list of one or more unspent transaction outputs.

Clause 3.12. A method according to clauses 3.10 or 3.11, and comprising the steps:

receiving the communication at the at least one further processing resource;

changing the state of the locking flag from the first state to the second state, or second state to the first state.

Clause 3.13. A method according to any preceding clause, wherein:

i) the portion of the Merkle tree is a sub-portion or segment of the Merkle tree for the blockchain block; and/or ii) the plurality of blockchain transactions is represented by an inner node of the Merkle tree.

Clause 3.14. A blockchain implemented system comprising a plurality of processing resources, each comprising:

a processor; and memory including executable instructions that, as a result of execution by the processor, causes or enables the system to perform the computer-implemented method of any preceding clause.

15. A non-transitory computer-readable storage medium having stored thereon executable instructions that, as a result of being executed by a processor of a computer system, cause or enable the computer system to perform the computer-implemented method of any one of clauses 3.1 to 3.13.

Clause Set 4

Any embodiment defined in any clause or combination of clauses in clause set 4 may be arranged to implement or combine with any clause(s) in clause sets 1 to 3.

Clause 4.1. A system operative to validate at least a portion of a blockchain block that comprises a plurality of blockchain transactions and a root of a Merkle tree for the block, the system comprising:

a plurality of processing (e.g. validating) resources, each comprising:

at least one processor associated with at least one portion of memory storing executable instructions that, as a result of execution by the at least one processor, causes or enable the validating resource to:

process (e.g. validate) at least one subset of the plurality of blockchain transactions, wherein the at least one subset provides a portion of the Merkle tree and is represented by an inner node of the Merkle tree.

Clause 4.2. A system according to clause 4.1, wherein the system further comprises:

i) a load balancing component arranged to facilitate balancing of the distribution of a plurality of subsets of the plurality blockchain transactions among the plurality of validating resources; and/or ii) a segment identification component arranged to facilitate identification of the at least one subset of the plurality of blockchain transactions; and/or iii) an allocation unit; and/or iv) one or more interfaces for sending or receiving communications between the system and one or more data sources or destinations.

Clause 4.3. A system according to clause 4.1 or 4.2, wherein:

the system comprises at least one controller component arranged to influence and/or control the operations of at least one of:

at least one validating resource;

at least one processor of the at least one validating resource;

one or more interfaces;

one or more load balancing components; and/or a one or more segment identification components arranged to facilitate identification of the at least one subset of the plurality of blockchain transactions.

Clause 4.4. A system according to any preceding clause wherein:

i) at least two transactions in the plurality of blockchain transactions are siblings in the Merkle tree; and/or ii) the inner node is a parent or an ancestor of the subset of blockchain transactions.

Clause 4.5. A system according to any preceding clause and further comprising a plurality of output repositories, each repository in the plurality associated with a respective validating resource and arranged to facilitate recording, searching and/or processing of a plurality of unspent transaction outputs (e.g. UTXOs); preferably wherein each plurality of unspent transaction outputs is associated with at least one transaction (Tx) in the plurality of blockchain transactions.

Clause 4.6. A system according to clause 4.5, wherein the system is operative to:

create and/or maintain a database log that comprises a history of actions, changes and events relating to at least one of the plurality of output repositories.

Clause 4.7. A system according to any preceding clause, wherein:

at least one of the plurality of output repositories comprises at least one record associated with:

i) an unspent transaction output; and/or ii) an identifier that is associated with a) an unspent transaction output and/or b) a transaction (Tx) in the plurality of blockchain transactions Clause 4.8. A system according to clause 4.7, wherein:

the at least one record comprises a record identifier having:

i) a block identifier (block_ID) associated with the blockchain block; and/or ii) a transaction identifier (TxID) associated with a transaction (Tx) in the plurality of blockchain transactions.

Clause 4.9. A system according to clause 4.7 or 4.8, wherein the record identifier comprises:

i) a function of the block identifier (block_ID) and the transaction identifier (TxID); and/or ii) a concatenation of the block identifier (block_ID) and the transaction identifier (TxID).

10. A system according to claim 8 or 9, wherein the system is operative to:

use the record identifier to search for, identify, access or insert the at least one record in at least one output repository in the plurality of output repositories.

Clause 4.11 A system according to any of clauses 4.5 to 4.10, wherein:

at least one unspent transaction output (UTXO) in the plurality of transaction outputs (UTXOs) is associated with a locking flag which:

i) indicates whether the unspent transaction output (UTXO) is available or unavailable for spending; and/or ii) is configurable between a first state indicative that spending of the unspent transaction output is allowed and a second state indicative that spending of the unspent transaction output is prohibited.

Clause 4.12. A system according to clause 4.11, the system operative to:

change a state of the locking flag from the first state to the second state, or second state to the first state.

Clause 4.13. A system according to any preceding clause, wherein the system is operative to:

i) allocate respective subsets of the blockchain transactions to the plurality of validating resources; and ii) use one, some or all of the plurality of validating resources to download and/or receive respective subsets of blockchain transactions.

Clause 4.14. A system according to any preceding clause, and operative to:

use one, some or all of the validating resources to generate a respective candidate inner node of the Merkle tree based on the respective downloaded subset of blockchain transactions; and further operative to perform at least one of the following:

verify that the respective candidate inner node matches the respective inner node of the Merkle tree; and/or;

verify that the respective candidate inner node is a node of the Merkle tree by performing a Merkle proof based on the root of the Merkle tree; and/or send the respective candidate inner node of the Merkle tree to one or more other processing resources.

Clause 4.15. A system according to any preceding clause, wherein the system is operative to:

i) validate and/or verify at least one blockchain transaction; and/or ii) perform a Simplified Payment Verification process; and/or iii) confirm whether a given blockchain transaction is contained within the blockchain block; and/or iii) generate a hash of at least one of the blockchain transactions, using the hash to construct a Merkle path and/or checking whether the hash matches a transaction identifier in a header of the blockchain block.

Clause 4.16. A system according to any preceding clause wherein:

at least one of the plurality of validating resources is, or comprises at least one of: a virtual machine, a server, a GPU-based computing resource, a thread, and/or a multiprocessor system.

Clause Set 5:

Embodiments of the presently claimed disclosure may be presented in the following enumerated clauses. Any of the features provided in the following clause set(s) may be combined with one or more of the features in any one or more of the preceding enumerated clause sets.

The present disclosure may provide methods and systems for distributed and/or parallel processing of data records. It may provide such methods/systems for mining of blockchain transactions in a blockchain block, and/or for generation of a Proof-of-Work (PoW) or Proof-of Stake (PoS) for a blockchain block. Advantageously, embodiments may allow for separation of the PoW or Proof-of-Stake calculation from other blockchain mining/validation tasks. Herein, we will simply refer to Proof-of-Work for convenience although this should not be construed as excluding Proof-of-Stake. The disclosure may be described as providing an authorisation and/or control mechanism for improved blockchain mining techniques and/or improved PoW generation techniques. It may also be described as an improved security technique.

Preferably, a PoW requester (first party/entity) may send a specialist PoW provider (second party/entity) one or more of: i) a Merkle root for a Merkle tree that represents a set of transactions ii) a control transaction ($TX_0$) and iii) a Merkle proof which confirms that $TX_0$ is included in the set of transactions. $TX_0$ may provide or comprise control data that the PoW provider can use to determine whether or not performance of the PoW calculation is to be performed or completed.

A preferred embodiment may be described as:

Clause 5.1. A computer-implemented method comprising:

sending, from a first resource to a second resource, a request to generate a Proof-Of-Work (PoW) for a blockchain block containing a plurality of transactions, the request comprising a Merkle proof for verification that a control transaction ($TX_0$) is included in the plurality of transactions; and/or receiving, at the second resource from the first resource, a request to generate a Proof-Of-Work (PoW) for a blockchain block containing a plurality of transactions, the request comprising a Merkle proof for verification that a control transaction ($TX_0$) is included in the plurality of transactions.

The first resource may be a PoW requester and the second resource may be a PoW provider. The PoW may be any PoW specified by a blockchain protocol. The Merkle proof may comprise data sufficient to prove that a given blockchain transaction is included in a particular set of transactions, and conversely disprove that it is included in the set of transactions. The set of transactions may be represented by a Merkle tree T that has a Merkle root R.

Clause 5.2. A method according to clause 1, wherein:

the control transaction ($TX_0$) comprises control data for controlling, allowing and/or prohibiting the performance of the Proof-of-Work generation; preferably wherein the control data comprises:

i) at least one output that specifies a predetermined address for the destination of a blockchain transfer;

preferably wherein the address is associated with the second resource or a party associated with or authorised by the second resource; and/or ii) at least one pre-determined signature; and/or iii) at least one secret value or secret portion of data.

Clause 5.3. A method according to clause 1 or 2, wherein:

the first resource is a PoW requesting resource, a blockchain validation resource or a blockchain mining resource; and/or the second resource is a Proof-of-Work Provider; and/or the second resource comprises at least one ASIC or hash machine or specialized cryptocurrency mining resource.

Clause 5.4. A method according to any preceding clause, and further comprising:

i) receiving, at the first resource from the second resource, a Proof-Of-Work for the blockchain block; and/or ii) sending, to the first resource from the second resource, a Proof-Of-Work for the blockchain block.

Clause 5.5. A method according to any preceding clause, wherein the Proof-Of-Work comprises:

a value (nonce) arranged to provide an output that satisfies one or more of: a target, rule or criteria specified by a blockchain protocol; and/or a block header for the blockchain block; and/or a puzzle or challenge solution specified in accordance with a blockchain protocol.

Clause 5.6. A method according to any preceding clause, wherein generating the Proof-Of-Work comprises:

i) generating or selecting a value (nonce) arranged to provide an output that meets a target, challenge, rule or criteria specified by a blockchain protocol;

ii) concatenating a block message for the blockchain block with a nonce; and/or iii) double hashing a block header for the blockchain block.

Clause 5.7. A method according to any preceding clause, and comprising processing or comparing at least a portion of the control transaction ($TX_0$) in respect of a pre-defined control criteria and generating or not generating the Proof-of-Work based on the output of the processing or comparison;

preferably wherein the control criterium comprises at least one of a threshold, rule or criteria for allowing initiation, performance or completion or the Proof-Of-Work generation.

Clause 5.8. A method according to clause 5.7 and further comprising:

allowing or prohibiting the generation of the Proof-of-Work based upon:

i) successful or unsuccessful confirmation that the control transaction ($TX_0$) is included in the plurality of transactions; and/or ii) determination that the control transaction comprises or does not comprise a portion of data which satisfies a predetermined rule or criteria; and/or iii) determination that the control transaction or at least a portion of it meets the control criteria.

Clause 5.9. A method according to any preceding clause, and comprising the step of determining, at the first or second resource, a portion of data required by a blockchain protocol for generation of a Proof-of-Work for a block, the portion of data comprising one or more of:

a protocol version identifier;

a block hash;

a Proof-of-Work difficulty target specified by the protocol; and/or a timestamp.

Clause 5.10. A method according to any preceding clause, wherein:

i) the Merkle proof comprises data arranged to enable performance of an SPV verification to determine whether the control transaction is included in the plurality of transactions;

ii) the request includes the control transaction.

Clause 5.11. A method according to any preceding clause, and comprising the step of:

processing the plurality of transactions to a provide a Merkle tree;

preferably wherein the processing involves a hashing function.

Clause 5.12. A method according to any preceding clause, wherein:

the control transaction ($TX_0$) comprises an identifier to enable the second resource to identify the first resource; preferably wherein the identifier is provided in an input, output, script or metadata portion of the control transaction.

Clause 5.13. A system operative to control or influence the generation of a Proof-Of-Work generation for a blockchain block containing a plurality of transactions, and/or operative to implement the method of any preceding clause.

Clause 5.14. A system in accordance with clause 5.13 and comprising at least one of:

at least one Proof-Of-Work providing resource (1000);

preferably wherein the at least one Proof-Of-Work providing resource comprises at least one ASIC or hash machine (1100*a* to 1100*c*); at least one Proof-Of-Work requesting resource (1300);

preferably wherein the at least one Proof-Of-Work requesting resource comprises a distributed validation node (700) substantially disclosed herein.

Clause 5.15. A non-transitory computer-readable storage medium having stored thereon executable instructions that, as a result of being executed by a processor of a computer system, cause or enable the computer system to perform the computer-implemented method of any one of clauses 5.1 to 5.13.

Example Technical Environment for Implementation of an Illustrative Embodiment of the Disclosure We now describe an overview of a computing environment in which one or more embodiments of the disclosure may be put into practice. However, as noted above, this context is not intended to be limiting and embodiments may be put into effect for the processing of data records and structures that are not implemented via a blockchain. Non-blockchain embodiments may be devised e.g. using a database instead of a distributed ledger.

FIG. 1 shows an example system 100 for implementing a blockchain 150. The system 100 may comprise a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151. The ordered pool 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction **152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the ordered set 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i*** could equally be called the antecedent or predecessor transaction.

The input of the present transaction **152*j* also comprises the input authorisation, for example the signature of the user 103*a* to whom the output of the preceding transaction 152*i* is locked. In turn, the output of the present transaction 152*j* can be cryptographically locked to a new user or entity 103*b*. The present transaction 152*j* can thus transfer the amount defined in the input of the preceding transaction 152*i* to the new user or entity 103*b* as defined in the output of the present transaction 152*j*. In some cases a transaction 152 may have multiple outputs to split the input amount between multiple users or entities (one of whom could be the original user or entity 103*a*** in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction **152*j* (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152*j* could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152*j* matches the expected signature, which depends on the previous transaction 152*i* in an ordered sequence of transactions 152. In such an output-based transaction protocol, this may comprise checking that the cryptographic signature or other authorisation of the party 103 included in the input of the new transaction 152*j* matches a condition defined in the output of the preceding transaction 152*i* which the new transaction assigns, wherein this condition typically comprises at least checking that the cryptographic signature or other authorisation in the input of the new transaction 152*j* unlocks the output of the previous transaction 152*i* to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152*j* is valid, the blockchain node 104 forwards it to one or more other blockchain nodes 104 in the blockchain network 106. These other blockchain nodes 104 apply the same test according to the same blockchain node protocol, and so forward the new transaction 152*j* on to one or more further nodes 104, and so forth. In this way the new transaction is propagated throughout the network of blockchain nodes 104**.

In an output-based model, the definition of whether a given output (e.g. UTXO) is assigned (e.g. spent) is whether it has yet been validly redeemed by the input of another, onward transaction **152*j* according to the blockchain node protocol. Another condition for a transaction to be valid is that the output of the preceding transaction 152*i* which it attempts to redeem has not already been redeemed by another transaction. Again if not valid, the transaction 152*j* will not be propagated (unless flagged as invalid and propagated for alerting) or recorded in the blockchain 150**. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block **151*n* pointing back to the previously created block 151*n*-1 in the chain. The significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106**, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block **151*n* and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150**. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block **151*n*. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151*n*** in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party **103*a* and his/her respective computer equipment 102*a*, and a second party 103*b* and his/her respective computer equipment 102*b*. It will be understood that many more such parties 103 and their respective computer equipment 102 may be present and participating in the system 100, but for convenience they are not illustrated. Each party 103 may be an individual or an organization. Purely by way of illustration the first party 103*a* is referred to herein as Alice and the second party 103*b*** is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction **152*j* to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152*j*, it handles it in accordance with the blockchain node protocol and its respective role. This comprises first checking whether the newly received transaction 152*j* meets a certain condition for being "valid", examples of which will be discussed in more detail shortly. In some transaction protocols, the condition for validation may be configurable on a per-transaction basis by scripts included in the transactions 152**. Alternatively the condition could simply be a built-in feature of the node protocol, or be defined by a combination of the script and the node protocol.

On condition that the newly received transaction **152*j* passes the test for being deemed valid (i.e. on condition that it is "validated"), any blockchain node 104 that receives the transaction 152*j* will add the new validated transaction 152 to the ordered set of transactions 154 maintained at that blockchain node 104. Further, any blockchain node 104 that receives the transaction 152*j* will propagate the validated transaction 152 onward to one or more other blockchain nodes 104 in the network 106. Since each blockchain node 104 applies the same protocol, then assuming the transaction 152*j* is valid, this means it will soon be propagated throughout the whole network 106**.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction **152*j*). Once the proof-of-work has been done for the pool 154 including the new transaction 152*j*, it immutably becomes part of one of the blocks 151 in the blockchain 150. Each transaction 152** comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

UTXO-Based Model

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103*a* wishes to create a transaction 152*j* transferring an amount of the digital asset in question to Bob 103*b*. In FIG. 2 Alice's new transaction 152*j* is labelled "Tx-". It takes an amount of the digital asset that is locked to Alice in the output 203 of a preceding transaction 152*i* in the sequence, and transfers at least some of this to Bob. The preceding transaction 152*i* is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (also known as scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (also known as scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$> <$P_A$>||[Checksig $P_A$]

where "||" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_. . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Side Channel

As shown in FIG. 1, the client application on each of Alice and Bob's computer equipment 102*a*, 120*b*, respectively, may comprise additional communication functionality. This additional functionality enables Alice 103*a* to establish a separate side channel 107 with Bob 103*b* (at the instigation of either party or a third party). The side channel 107 enables exchange of data separately from the blockchain network. Such communication is sometimes referred to as "off-chain" communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 107 may be used to exchange any other transaction related data, such as keys, negotiated amounts or terms, data content, etc.

The side channel 107 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102*a*, 102*b*. Generally, the side channel 107 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 107. Note therefore that if it is said that Alice and Bob exchange certain pieces of information or data, or such like, over the side channel 107, then this does not necessarily imply all these pieces of data have to be send over exactly the same link or even the same type of network.

FURTHER REMARKS

Other variants or use cases of the disclosed techniques may become apparent to the person skilled in the art once given the disclosure herein. The scope of the disclosure is not limited by the described embodiments but only by the accompanying claims. For instance, some embodiments above have been described in terms of a bitcoin network 106, bitcoin blockchain 150 and bitcoin nodes 104. However, it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the disclosure, the blockchain network 106 is the bitcoin network and bitcoin nodes 104 perform at least some or all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106). In other embodiments of the disclosure, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

The term "user" may be used herein to include human and machine-based entities. The above-mentioned embodiments illustrate rather than limit the disclosure, and those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". Throughout this specification the word "comprise", or variations such as "includes", "comprises" or "comprising", will be understood to imply the inclusion of a stated element, integer or step, or group of elements, integers or steps, but not the exclusion of any other element, integer or step, or group of elements, integers or steps. The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method for distributing blockchain mining in accordance with a blockchain protocol, the method comprising:

i) sending, from a first computing resource comprising hardware and/or software apparatus to a second computing resource comprising at least one ASIC, hash machine, specialized cryptocurrency mining resource or at least one integrated circuit chip arranged to mine a cryptocurrency in accordance with the blockchain protocol, a first request to generate a Proof-Of-Work (PoW) for an entire or partial candidate blockchain block containing a particular plurality of transactions, wherein:

the particular plurality of transactions comprises a coinbase transaction if the blockchain protocol requires one; and the first request comprises a Merkle proof for verification that a control transaction (TXo) is included in the particular plurality of transactions, wherein the control transaction is arranged to fulfil an authorization requirement specified by the second resource or an associated entity that authorizes or directs activities of the second resource; and/or ii) receiving, at the second resource from the first computing resource, a second request to generate the Proof-Of-Work (PoW) for the entire or partial candidate blockchain block containing the particular plurality of transactions, wherein:

the particular plurality of transactions comprises a coinbase transaction if the blockchain protocol requires one; and the second request comprises the Merkle proof for verification that the control transaction (TXo) is included in the particular plurality of transactions, wherein the control transaction is arranged to fulfil the authorization requirement specified by the second resource or the associated entity that authorizes or directs the activities of the second resource.

2. The method of claim 1, wherein:

the control transaction (TXo) comprises control data for controlling, allowing and/or prohibiting performance of the requested Proof-of-Work generation; preferably wherein the control data comprises:

i) at least one output that specifies a predetermined address for a destination of a blockchain transfer; preferably wherein the address is associated with the second resource, or a party associated with or authorised by the second resource; and/or ii) at least one pre-determined signature; and/or iii) at least one secret value or secret portion of data.

3. The method of claim 1, wherein:

the first resource is a PoW requesting resource, a blockchain validation resource or a blockchain mining resource; and/or the second resource is a Proof-of-Work Provider.

4. The method of claim 1, and further comprising:

i) receiving, at the first resource from the second resource, a Proof-Of-Work for the blockchain block; and/or ii) sending, to the first resource from the second resource, a Proof-Of-Work for the blockchain block.

5. The method of claim 1, wherein the Proof-Of-Work comprises:

a value (nonce) arranged to provide an output that satisfies one or more of: a target, rule or criteria specified by a blockchain protocol; and/or a block header for the blockchain block; and/or a puzzle or challenge solution specified in accordance with a blockchain protocol.

6. The method of claim 1, wherein generating the Proof-Of-Work comprises:

i) generating or selecting a value (nonce) arranged to provide an output that meets a target, challenge, rule or criteria specified by a blockchain protocol;

ii) concatenating a block message for the blockchain block with a nonce; and/or iii) double hashing a block header for the blockchain block.

7. The method of claim 1, and comprising processing or comparing at least a portion of the control transaction ($TX_0$) in respect of a pre-defined control criteria and generating or not generating the Proof-of-Work based on an output of the processing or comparison;

preferably wherein the control criteria comprises at least one of a threshold, rule or criteria for allowing initiation, performance or completion or the Proof-Of-Work generation.

8. The method of claim 7 and further comprising:

allowing or prohibiting the generation of the Proof-of-Work based upon:

i) successful or unsuccessful confirmation that the control transaction (TXo) is included in the plurality of transactions; and/or ii) determination that the control transaction comprises or does not comprise a portion of data which satisfies a predetermined rule or criteria; and/or iii) determination that the control transaction or at least a portion of it meets the control criteria.

9. The method of claim 1, and comprising the step of determining, at the first or second resource, a portion of data required by a blockchain protocol for generation of a Proof-of-Work for a block, the portion of data comprising one or more of:

a protocol version identifier;

a block hash;

a Proof-of-Work difficulty target specified by the protocol; and/or a timestamp.

10. The method of claim 1, wherein:

i) the Merkle proof comprises data arranged to enable performance of an SPV verification to determine whether the control transaction is included in the plurality of transactions;

ii) the first request or the second request includes the control transaction.

11. The method of claim 1, and comprising the step of:

processing the plurality of transactions to a provide a Merkle tree;

preferably wherein the processing involves a hashing function.

12. The method of claim 1, wherein:

the control transaction ($TX_0$) comprises an identifier to enable the second resource to identify the first resource; preferably wherein the identifier is provided in an input, output, script or metadata portion of the control transaction.

13. A computer system operative to control or influence the generation of a Proof-Of-Work generation for an entire or partial blockchain block containing a particular plurality of transactions which comprises a coinbase transaction if the blockchain protocol requires one, the computer system including a memory storing computer code that, when executed by the computer system, cause the computer system and/or operative to implement a method of:

sending, from a first computing resource comprising hardware and/or software apparatus to a second computing resource comprising at least one ASIC, hash machine, specialized cryptocurrency mining resource or at least one integrated circuit chip arranged to mine a cryptocurrency in accordance with the blockchain protocol, a first request to generate a Proof-Of-Work (PoW) for the entire or partial blockchain block containing the particular plurality of transactions, wherein the first request comprises a Merkle proof for verification that a control transaction (TXo) is included in the particular plurality of transactions; and the control transaction is arranged to fulfil an authorization requirement specified by the second resource or an associated entity that authorizes or directs activities of the second resource; and/or receiving, at the second resource from the first resource, a second request to generate the Proof-Of-Work (PoW) for the entire or partial blockchain block containing the particular plurality of transactions, wherein the second request comprises the Merkle proof for verification that the control transaction (TXo) is included in the particular plurality of transactions, and the control transaction is arranged to fulfil the authorization requirement specified by the second resource or the associated entity that authorizes or directs the activities of the second resource.

14. The system of claim 13, further comprising at least one of:

at least one Proof-Of-Work providing resource;

preferably wherein the at least one Proof-Of-Work providing resource comprises at least one ASIC or hash machine; at least one Proof-Of-Work requesting resource;

preferably wherein the at least one Proof-Of-Work requesting resource comprises a distributed validation node.

15. A non-transitory computer-readable storage medium having stored thereon executable instructions that, as a result of being executed by a processor of a computer system, cause or enable the computer system to perform a computer-implemented method of:

sending, from a first computing resource comprising hardware and/or software apparatus to a second computing resource comprising at least one ASIC, hash machine, specialized cryptocurrency mining resource or at least one integrated circuit chip arranged to mine a cryptocurrency in accordance with the blockchain protocol, a first request to generate a Proof-Of-Work (PoW) for an entire or partial blockchain block containing a particular plurality of transactions, wherein the first request comprises:

a Merkle proof for verification that a control transaction (TXo) is included in the particular plurality of transactions; and the particular plurality of transactions comprises a coinbase transaction if the blockchain protocol requires one; and/or receiving, at the second resource from the first resource, a second request to generate the Proof-Of-Work (PoW) for the entire or partial blockchain block containing the particular plurality of transactions, wherein the second request comprises:

the Merkle proof for verification that the control transaction (TXo) is included in the particular plurality of transactions, and the particular plurality of transactions comprises a coinbase transaction if the blockchain protocol requires one.

* * * * *